(12) United States Patent
Statnikov et al.

(10) Patent No.: US 8,805,761 B2
(45) Date of Patent: Aug. 12, 2014

(54) COMPUTER IMPLEMENTED METHOD FOR DETERMINING ALL MARKOV BOUNDARIES AND ITS APPLICATION FOR DISCOVERING MULTIPLE MAXIMALLY ACCURATE AND NON-REDUNDANT PREDICTIVE MODELS

(76) Inventors: Alexander Statnikov, New York, NY (US); Konstantinos (Constantin) F. Aliferis, New York, NY (US)

( * ) Notice: Subject to any disclaimer, the term of this patent is extended or adjusted under 35 U.S.C. 154(b) by 640 days.

(21) Appl. No.: 12/610,046

(22) Filed: Oct. 30, 2009

(65) Prior Publication Data

US 2010/0217599 A1 Aug. 26, 2010

Related U.S. Application Data

(60) Provisional application No. 61/110,487, filed on Oct. 31, 2008.

(51) Int. Cl.
*G06N 7/00* (2006.01)
(52) U.S. Cl.
USPC .......................................................... 706/46
(58) Field of Classification Search
USPC .......................................................... 706/46
See application file for complete search history.

(56) References Cited

U.S. PATENT DOCUMENTS 7,912,698 B2 * 3/2011 Statnikov et al. ................. 704/8
2011/0202322 A1 * 8/2011 Statnikov et al. ................. 703/2

* cited by examiner

*Primary Examiner* — Susan McFadden
(74) *Attorney, Agent, or Firm* — Laurence Weinberger

(57) ABSTRACT

Methods for discovery of a Markov boundary from data constitute one of the most important recent developments in pattern recognition and applied statistics, primarily because they offer a principled solution to the variable/feature selection problem and give insight about local causal structure. Even though there is always a single Markov boundary of the response variable in faithful distributions, distributions with violations of the intersection property of probability theory may have multiple Markov boundaries. Such distributions are abundant in practical data-analytic applications, and there are several reasons why it is important to discover all Markov boundaries from such data. The present invention is a novel computer implemented generative method (termed TIE*) that can discover all Markov boundaries from a data sample drawn from a distribution. TIE* can be instantiated to discover all and only Markov boundaries independent of data distribution. TIE* has been tested with simulated and re-simulated data and then applied to (a) identify the set of maximally accurate and non-redundant molecular signatures and to (b) discover Markov boundaries in datasets from several application domains including but not limited to: biology, medicine, economics, ecology, digit recognition, text categorization, and computational biology.

17 Claims, 30 Drawing Sheets

Generative method TIE*

Inputs:
- dataset D (a sample of distribution P) for variables V, including a response variable $T$;
- Markov boundary method X;
- strategy Y to generate subsets of variables that have to be removed to identify new Markov boundaries of $T$;
- criterion Z to verify Markov boundaries of $T$.

Output: all Markov boundaries (i.e., maximally accurate and non-redundant signatures) of $T$.

1. Use method X to learn a Markov boundary M of $T$ from data D for variables V (i.e., in the "original" distribution)
2. Output M
3. Repeat
4.   Use strategy Y to generate a subset G whose removal may lead to identification of a new Markov boundary of $T$
5.   Use method X to learn a Markov boundary $\mathbf{M}_{new}$ of $T$ from data D for variables V \ G (i.e., in the "embedded" distribution)
6.   If $\mathbf{M}_{new}$ is a Markov boundary of $T$ in the original distribution according to criterion Z, output $\mathbf{M}_{new}$
7. Until all subsets G generated by strategy Y have been considered.

Fig. 2

An example of instantiated method TIE* for gene expression data analysis

Inputs: dataset D (a sample of distribution P) for variables V, including a response variable $T$;

Output: all Markov boundaries (i.e., maximally accurate and non-redundant signatures) of $T$.

1. Use method HITON-PC to learn a Markov boundary M of $T$ from data D for variables V (i.e., in the "original" distribution)
2. Output M
3. Repeat
4. Generate the smallest subset G of the so far discovered Markov boundaries of $T$ such that (i) it was not considered in the previous iteration of the method, and (ii) it does not properly include any subset that was generated in the previous iteration of the method when $\mathbf{M}_{new}$ was found not to be a Markov boundary of $T$
5. Use method HITON-PC to learn a Markov boundary $\mathbf{M}_{new}$ of $T$ from data D for variables V \ G (i.e., in the "embedded" distribution)
6. If the cross-validation estimate of predictive accuracy of $T$ for the SVM classifier model induced from data D using variables $\mathbf{M}_{new}$ is statistically indistinguishable from the respective predictive accuracy estimate for variables M, then $\mathbf{M}_{new}$ is a Markov boundary of $T$ in the original distribution and it is output by the method
7. Until no subset G can be generated in step 4.

Fig.3

Admissibility rules for inputs X, Y, Z of the TIE* method

I. The Markov boundary discovery method X correctly identifies a Markov boundary of $T$ both in the original distribution (i.e., for variables V) and in the embedded distribution after removing an arbitrary set of variables.
II. The strategy Y to generate subsets of variables is complete, i.e. it will generate every subset G that is needed to be removed from V to identify every Markov boundary of $T$.
III. The criterion Z can correctly identify that $\mathbf{M}_{new}$ is a Markov boundary of $T$ in the original distribution.

Fig.4

Method IAMB

Input: dataset D (a sample of distribution P) for variables V, including a response variable $T$.

Output: a Markov boundary M of $T$.

Phase I: Forward
1. Initialize M with an empty set
2. Repeat
3.     $Y \leftarrow \mathrm{argmax}_{X \in (V \setminus M \setminus \{T\})} \mathrm{Association}(T, X | M)$
4.     If $T \perp Y | M$ then
5.         $M \leftarrow M \cup \{Y\}$
6. Until M does not change

Phase II: Backward
7. For each $X \in M$
8.     If $T \perp X | (M \setminus \{X\})$ then
9.         $M \leftarrow M \setminus \{X\}$
10. End
11. Output M

Fig.5

Method HITON-PC (without "symmetry correction")

Input: dataset D (a sample of distribution P) for variables V, including a response variable $T$.

Output: a Markov boundary M of $T$.

1. Initialize M with an empty set
2. Initialize the set of eligible members $\mathbf{E} \leftarrow \mathbf{V} \setminus \{T\}$.
3. Sort in descending order the variables in E according to their pairwise association with response variable $T$
4. Remove from E all variables $X$ with zero association with $T$, i.e. when $T \perp X$
5. Repeat
6.     $X \leftarrow$ first variable in E
7.     Add $X$ to M and remove it from E
8.     If $\exists \mathbf{Z} \subseteq \mathbf{M} \setminus \{X\}$, such that $T \perp X \mid \mathbf{Z}$, remove $X$ from M
9. Until E is empty
10. For each $X \in \mathbf{M}$
11.     If $\exists \mathbf{Z} \subseteq \mathbf{M} \setminus \{X\}$, such that $T \perp X \mid \mathbf{Z}$, remove $X$ from M
12. Output M

Fig.6

Strategies INCLEX, INCMINASSOC, and INCMAXASSOC to generate subsets of variables that have to be removed from V to identify new Markov boundaries of $T$ Inputs:
- dataset D (a sample of distribution P) for variables V, including a response variable $T$;
- Markov boundaries $\mathbf{M}_1,...,\mathbf{M}_n$ of $T$ (in the original distribution) obtained so far by the TIE* method and ordered by the time of discovery from latest to earliest;
- subsets $\mathbf{G}_1,...,\mathbf{G}_n$ that were removed from V (in step 5 of TIE*) to obtain the above Markov boundaries ($\mathbf{G}_1 = \varnothing$);
- subsets $\mathbf{G}_1^*,...,\mathbf{G}_m^*$ that were removed from V (in step 5 of TIE*) and did not lead to Markov boundaries in the original distribution (in step 6 of TIE*).

Output: $\mathbf{G} \subseteq \bigcup_{i=1}^{n} \mathbf{M}_i$

Generate a subset of variables $\mathbf{G} \subseteq \mathbf{M}_i \cup \mathbf{G}_i$ ($i = 1, .., n$) with the smallest number of variables and the smallest lexicographical order (for strategy INCLEX) or the smallest association with $T$ (for strategy INCMINASSOC) or the largest association with $T$ (for strategy INCMAXASSOC) such that:
$\mathbf{G} \supset \mathbf{G}_i$, $\mathbf{G} \not\supseteq \mathbf{G}_j^*$, and $\mathbf{G} \neq \mathbf{G}_k$ for $j = 1, ..., m$ and $k = 1, ..., n$.

Fig.7

Criterion INDEPENDENCE to verify Markov boundaries

Inputs:
- dataset D (a sample of distribution P) for variables V, including a response variable $T$;
- Markov boundary M of $T$ in the original distribution;
- Markov boundary $\mathbf{M}_{new}$ of $T$ in the embedded distribution;

Output:
- TRUE if $\mathbf{M}_{new}$ is a Markov boundary of $T$ in the original distribution;
- FALSE if $\mathbf{M}_{new}$ is a not a Markov blanket of $T$ in the original distribution.

If $T \perp \mathbf{M} \mid \mathbf{M}_{new}$, output TRUE; otherwise output FALSE.

Fig.8

Criterion PREDICTIVITY to verify Markov boundaries

Inputs:
- dataset D (a sample of distribution P) for variables V, including a response variable $T$;
- Markov boundary M of $T$ in the original distribution;
- Markov boundary $\mathbf{M}_{new}$ of $T$ in the embedded distribution;
- predictive method L (to build a prediction model for $T$ given some subset of V);
- performance metric M (to assess the prediction model obtained by L; larger values of this performance metric correspond to better predictive accuracy of the model);
- unbiased performance estimator E (to estimate metric M for prediction model obtained by L in data D)
- statistical hypothesis test of another formal criterion C (to compare performance estimates of M)

Output:
- TRUE if $\mathbf{M}_{new}$ is a Markov boundary of $T$ in the original distribution;
- FALSE if $\mathbf{M}_{new}$ is a not a Markov blanket of $T$ in the original distribution.

1. Apply performance estimator E to compute estimate $\hat{M}^1$ of performance metric M for prediction model obtained by L in data D using variables M
2. Apply performance estimator E to compute estimate $\hat{M}^2$ of performance metric M for prediction model obtained by L in data D using variables $\mathbf{M}_{new}$
3. If the hypothesis $\hat{M}^1 > \hat{M}^2$ can be rejected according to criterion C, output TRUE; otherwise output FALSE.

Fig.9

| P(A) | |
|---|---|
| A = 0 | 0.6 |
| A = 1 | 0.4 |

| P(B) | |
|---|---|
| B = 0 | 0.3 |
| B = 1 | 0.2 |
| B = 2 | 0.3 |
| B = 3 | 0.2 |

| P(C \| A) | A = 0 | A = 1 |
|---|---|---|
| C = 0 | 0.0 | 1.0 |
| C = 1 | 1.0 | 0.0 |

| P(F) | |
|---|---|
| F = 0 | 0.3 |
| F = 1 | 0.7 |

| P(D \| B) | B = 0 | B = 1 | B = 2 | B = 3 |
|---|---|---|---|---|
| D = 0 | 1.0 | 1.0 | 0.0 | 0.0 |
| D = 1 | 0.0 | 0.0 | 1.0 | 1.0 |

| P(E \| B) | B = 0 | B = 1 | B = 2 | B = 3 |
|---|---|---|---|---|
| E = 0 | 1.0 | 0.0 | 1.0 | 0.0 |
| E = 1 | 0.0 | 1.0 | 0.0 | 1.0 |

| P(T \| C, D, E, F) | (C=0, D=0, E=0, F=0) | (C=0, D=0, E=0, F=1) | (C=0, D=0, E=1, F=0) | ... | (C=1, D=1, E=1, F=1) |
|---|---|---|---|---|---|
| T = 0 | 0.9 | 0.1 | 0.9 | ... | 0.1 |
| T = 1 | 0.1 | 0.9 | 0.1 | ... | 0.9 |

| P(T | C, D) | (C = 0, D = 0) | (C = 0, D = 1) | (C = 1, D = 0) | (C = 1, D = 1) |
|---|---|---|---|---|
| T = 0 | 0.2 | 0.5 | 0.7 | 0.4 |
| T = 1 | 0.8 | 0.5 | 0.3 | 0.6 |

| P(C | A, B) | (A = 0, B = 0) | (A = 0, B = 1) | (A = 1, B = 0) | (A = 1, B = 1) |
|---|---|---|---|---|
| C = 0 | 0.3 | 0.7 | 0.9 | 0.4 |
| C = 1 | 0.7 | 0.3 | 0.1 | 0.6 |

| P(D | A, B) | (A = 0, B = 0) | (A = 0, B = 1) | (A = 1, B = 0) | (A = 1, B = 1) |
|---|---|---|---|---|
| D = 0 | 0.6 | 0.7 | 0.8 | 0.4 |
| D = 1 | 0.4 | 0.3 | 0.2 | 0.6 |

| P(A) | |
|---|---|
| A = 0 | 0.6 |
| A = 1 | 0.4 |

| P(B) | |
|---|---|
| B = 0 | 0.4 |
| B = 1 | 0.6 |

| | HITON-PC | | | TIE* | | | | |
|---|---|---|---|---|---|---|---|---|
| | Performance (AUC) | Number of features in MB | Time (minutes) | Number of MB's | Performance (AUC)* | Number of features in MB* | Time (minutes) | Performance (AUC), 95% interval | Number of features in MB, 95% interval | Number of MB's with performance ≥ to the one from HITON-PC |

| | Performance (AUC) | Number of features in MB | Time (minutes) | Number of MB's | Performance (AUC)* | Number of features in MB* | Time (minutes) | Performance (AUC), 95% interval | Number of features in MB, 95% interval | Number of MB's with performance ≥ to the one from HITON-PC |
|---|---|---|---|---|---|---|---|---|---|---|
| Infant_Mortality | 0.851 | 4 | 0.02 | 1 | 0.851 | 4.0 | 0.02 | 0.851 - 0.851 | 4 - 4 | - |
| Bankruptcy | 0.956 | 44 | 0.15 | 51 | 0.955 | 44.5 | 32 | 0.956 - 0.957 | 42.8 - 46 | 17 |
| Ovarian_Cancer | 0.962 | 5.5 | 1 | 5.6 | 0.962 | 5.6 | 3 | 0.956 - 0.967 | 5.5 - 5.7 | 4.4 |
| Breast_Cancer | 0.894 | 6.3 | 12 | 12.3 | 0.910 | 6.2 | 49 | 0.871 - 0.935 | 5.5 - 6.9 | 8.7 |
| Lymphoma | 0.613 | 7.6 | 2 | 15.2 | 0.605 | 7.5 | 11 | 0.535 - 0.668 | 6.3 - 8.8 | 7 |
| Gisette | 0.992 | 87 | 36 | 19 | 0.992 | 87.0 | 1521 | 0.992 - 0.992 | 87 - 87 | 15 |
| ACPJ_Etiology | 0.912 | 10 | 2 | 2 | 0.913 | 10.0 | 6 | 0.912 - 0.913 | 10 - 10 | 2 |
| Ohsumed | 0.847 | 43 | 1 | 8 | 0.851 | 47.8 | 10 | 0.843 - 0.859 | 43 - 50 | 6 |
| Nova | 0.947 | 174 | 2 | 6 | 0.949 | 174.3 | 725 | 0.948 - 0.951 | 174 - 175 | 6 |
| Hiva | 0.736 | 6 | 0.10 | 9 | 0.697 | 6.0 | 0.33 | 0.619 - 0.736 | 6 - 6 | 6 |
| Thrombin | 0.847 | 7 | 64 | 1 | 0.847 | 7.0 | 305 | 0.847 - 0.847 | 7 - 7 | - |
| Sylva | 0.997 | 24 | 5 | 1 | 0.997 | 24.0 | 81 | 0.997 - 0.997 | 24 - 24 | - |
| Dexter | 0.978 | 62.9 | 6 | 1.7 | 0.979 | 63.1 | 70 | 0.978 - 0.980 | 62.8 - 63.3 | 1.5 |

* Averaged over multiple output MB's.

Fig. 20

| Task | Discovery dataset | | | | | | Validation dataset | | | | | Num. of common genes |
|---|---|---|---|---|---|---|---|---|---|---|---|---|
| | Ref. | Sample size | Samples per class | Num. of genes | Platform | Ref. | Sample size | Samples per class | Num. of genes | Platform | | |
| Lung Cancer Diagnosis: lung tumors vs. normals (non-tumor lung samples) | (Bhattacharjee et al., 2001) | 203 | lung tumors (186) normals (17) | 12600 | Affymetrix U95A | (Beer et al., 2002) | 96 | lung tumors (86) normals (10) | 7129 | Affymetrix HuGeneFL | 7094 |
| Lung Cancer Subtype Classification: adenocarcinoma vs. squamous cell carcinoma lung tumors | (Bhattacharjee et al., 2001) | 160 | adenocarcinoma (139) squamous (21) | 12600 | Affymetrix U95A | (Su et al., 2001) | 28 | adenocarcinoma (14) squamous (14) | 12533 | Affymetrix U95A | 12533 |
| Breast Cancer Subtype Classification: estrogen receptor positive (ER+) vs. ER- breast tumors; untreated patients | (Wang et al., 2005) | 286 | ER+ (209) ER- (77) | 22283 | Affymetrix U133A | (Sotiriou et al., 2006) | 119 | ER+ (85) ER- (34) | 22283 | Affymetrix U133A | 22283 |
| Breast Cancer 5 Yr. Prognosis: ER+ patients who developed distant metastases within 5 years (poor prognosis) vs. ones who did not (good prognosis) | (Wang et al., 2005) | 204 | poor prognosis (66) good prognosis (138) | 22283 | Affymetrix U133A | (Sotiriou et al., 2006) | 72 | poor prognosis (13) good prognosis (59) | 22283 | Affymetrix U133A | 22283 |

Fig.21A

| Task | Discovery dataset | | | | | Validation dataset | | | | | Num. of common genes |
|---|---|---|---|---|---|---|---|---|---|---|---|
| | Ref. | Sample size | Samples per class | Platform | Num. of genes | Ref. | Sample size | Samples per class | Platform | Num. of genes | |
| Glioma Subtype Classification: grade III vs. grade IV glioma tumors | (Phillips et al., 2006) | 100 | grade III (24) grade IV (76) | Affymetrix U133A | 22283 | (Freije et al., 2004) | 85 | grade III (26) grade IV (59) | Affymetrix U133A | 22283 | 22283 |
| Leukemia 5 Yr. Prognosis: patients with disease-free survival < 5 years (ones who had relapse or competing events within 5 years) vs. > 5 years | (Yeoh et al., 2002) | 164 | survival < 5 yr. (29) survival > 5 yr. (135) | Affymetrix U95A | 12625 | (Ross et al., 2003) | 79 | survival < 5 yr. (18) survival > 5 yr. (61) | Affymetrix U133A | 22283 | 10507 |

Fig.21B

| Method | Total number of output predictive models | Number of variables in an average output predictive model | Number of true predictive models | | Average number of redundant variables in identified true predictive models | Average classification performance in validation data | CPU time in minutes |
|---|---|---|---|---|---|---|---|
| | | | identified exactly | identified with redundant variables | | | |
| TIE* | 72 | 5.00 | 72 | 72 | 0.00 | 0.951 | 0.39 |
| Iterative Removal | 3 | 4.67 | 0 | 1 | 1.00 | 0.946 | 0.01 |
| KIAMB1 | 5000 | 2.83 | 0 | 0 | N/A | 0.776 | 11.55 |
| KIAMB2 | 5000 | 2.82 | 0 | 0 | N/A | 0.772 | 11.69 |
| KIAMB3 | 5000 | 2.81 | 0 | 0 | N/A | 0.774 | 11.62 |
| Resampling+Univariate1 | 5000 | 17.87 | 0 | 72 | 12.00 | 0.949 | 84.56 |
| Resampling+Univariate2 | 5000 | 7.54 | 0 | 25 | 12.12 | 0.924 | 85.50 |
| Resampling+RFE1 | 5000 | 14.25 | 0 | 72 | 5.01 | 0.954 | 78.71 |
| Resampling+RFE2 | 5000 | 5.80 | 1 | 44 | 4.25 | 0.939 | 79.26 |

Fig.22

| Method | Total number of output predictive models | Number of variables in an average output predictive model | Number of true predictive models | | Average number of redundant variables in identified true predictive models | Average classification performance in validation data | CPU time in minutes |
|---|---|---|---|---|---|---|---|
| | | | identified exactly | identified with redundant variables | | | |
| TIE* | 72 | 5.00 | 72 | 72 | 0.00 | 0.957 | 0.46 |
| Iterative Removal | 3 | 5.67 | 0 | 1 | 2.00 | 0.959 | 0.04 |
| KIAMB1 | 5000 | 2.82 | 0 | 0 | N/A | 0.798 | 285.42 |
| KIAMB2 | 5000 | 2.81 | 0 | 0 | N/A | 0.796 | 285.45 |
| KIAMB3 | 5000 | 2.80 | 0 | 0 | N/A | 0.796 | 285.48 |
| Resampling+ Univariate1 | 5000 | 11.10 | 0 | 72 | 12.29 | 0.942 | 5999.64 |
| Resampling+ Univariate2 | 5000 | 5.58 | 0 | 0 | N/A | 0.934 | 6000.41 |
| Resampling+RFE1 | 5000 | 8.70 | 0 | 72 | 6.38 | 0.952 | 6235.28 |
| Resampling+RFE2 | 5000 | 4.24 | 0 | 29 | 5.76 | 0.947 | 6235.93 |

Fig.23

*Lung Cancer Diagnosis*

| Method to induce multiple signatures | Number of signatures | Number of genes in a signature | | Classification performance (AUC) | | | |
|---|---|---|---|---|---|---|---|
| | | mean | 95% interval | In discovery dataset | | In validation dataset | |
| | | | | mean | 95% interval | mean | 95% interval |
| TIE* | 348/348/187 | 6 | [4 - 8] | 0.999 | [0.994 - 1.000] | 0.998 | [0.988 - 1.000] |
| Resampling+ SVM-RFE1 | 5000/2966/48 | 9 | [1 - 43] | 0.987 | [0.919 - 1.000] | 0.989 | [0.949 - 1.000] |
| Resampling+ SVM-RFE2 | 5000/341/61 | 1 | [1 - 2] | 0.967 | [0.861 - 1.000] | 0.962 | [0.633 - 1.000] |
| Resampling+ Univariate1 | 5000/2199/19 | 19 | [1 - 62] | 0.99 | [0.919 - 1.000] | 0.992 | [0.949 - 1.000] |
| Resampling+ Univariate2 | 5000/294/58 | 1 | [1 - 2] | 0.969 | [0.861 - 1.000] | 0.973 | [0.887 - 1.000] |
| KIAMB1 | 985/985/985 | 41 | [39 - 42] | 0.999 | [0.990 - 1.000] | 0.995 | [0.984 - 1.000] |
| KIAMB2 | 1489/1320/1246 | 48 | [12 - 68] | 0.999 | [0.990 - 1.000] | 0.995 | [0.978 - 1.000] |
| KIAMB3 | 5000/271/157 | 9 | [6 - 15] | 0.996 | [0.981 - 1.000] | 0.997 | [0.992 - 1.000] |
| Iterative Removal | 51/51/51 | 7 | [5 - 10] | 0.987 | [0.919 - 1.000] | 0.977 | [0.880 - 1.000] |

*Lung Cancer Subtype Classification*

| Method to induce multiple signatures | Number of signatures | Number of genes in a signature | | Classification performance (AUC) | | | |
|---|---|---|---|---|---|---|---|
| | | mean | 95% interval | In discovery dataset | | In validation dataset | |
| | | | | mean | 95% interval | mean | 95% interval |
| TIE* | 668/668/413 | 7 | [5 - 8] | 0.987 | [0.973 - 1.000] | 0.973 | [0.929 - 1.000] |
| Resampling+ SVM-RFE1 | 5000/4267/20 | 392 | [1 - 5037] | 0.98 | [0.909 - 1.000] | 0.978 | [0.888 - 1.000] |
| Resampling+ SVM-RFE2 | 5000/1206/107 | 2 | [1 - 5] | 0.925 | [0.650 - 0.985] | 0.914 | [0.668 - 0.995] |
| Resampling+ Univariate1 | 5000/4590/55 | 528 | [1 - 8703] | 0.98 | [0.903 - 1.000] | 0.98 | [0.883 - 1.000] |
| Resampling+ Univariate2 | 5000/917/81 | 3 | [1 - 6] | 0.922 | [0.839 - 0.988] | 0.916 | [0.770 - 0.985] |
| KIAMB1 | 994/968/965 | 26 | [24 - 26] | 0.986 | [0.967 - 1.000] | 0.982 | [0.923 - 1.000] |
| KIAMB2 | 1006/1005/1005 | 48 | [47 - 50] | 0.99 | [0.973 - 1.000] | 0.982 | [0.923 - 1.000] |
| KIAMB3 | 3520/1364/1209 | 16 | [8 - 31] | 0.98 | [0.948 - 0.997] | 0.982 | [0.923 - 1.000] |
| Iterative Removal | 29/29/29 | 8 | [5 - 12] | 0.978 | [0.867 - 1.000] | 0.972 | [0.882 - 1.000] |

Fig.24A

*Breast Cancer Subtype Classification*

| Method to induce multiple signatures | Number of signatures | Number of genes in a signature | | Classification performance (AUC) | | | |
|---|---|---|---|---|---|---|---|
| | | | | In discovery dataset | | In validation dataset | |
| | | mean | 95% interval | mean | 95% interval | mean | 95% interval |
| TIE* | 2776/2776/1602 | 17 | [14 - 21] | 0.847 | [0.824 - 0.873] | 0.887 | [0.852 - 0.916] |
| Resampling+ SVM-RFE1 | 5000/4601/22 | 1627 | [1 - 10746] | 0.845 | [0.821 - 0.888] | 0.812 | [0.604 - 0.893] |
| Resampling+ SVM-RFE2 | 5000/2033/65 | 18 | [1 - 135] | 0.858 | [0.736 - 0.930] | 0.761 | [0.554 - 0.874] |
| Resampling+ Univariate1 | 5000/4122/15 | 3560 | [1 - 22283] | 0.857 | [0.826 - 0.920] | 0.823 | [0.771 - 0.877] |
| Resampling+ Univariate2 | 5000/794/22 | 7 | [1 - 18] | 0.873 | [0.754 - 0.930] | 0.814 | [0.725 - 0.874] |
| KIAMB1 | 983/970/960 | 31 | [30 - 32] | 0.85 | [0.804 - 0.883] | 0.68 | [0.427 - 0.846] |
| KIAMB2 | 994/964/962 | 28 | [27 - 29] | 0.85 | [0.802 - 0.884] | 0.685 | [0.418 - 0.850] |
| KIAMB3 | 943/570/493 | 14 | [12 - 15] | 0.856 | [0.786 - 0.884] | 0.694 | [0.432 - 0.851] |
| Iterative Removal | 34/34/34 | 19 | [14 - 23] | 0.833 | [0.793 - 0.866] | 0.834 | [0.720 - 0.899] |

*Breast Cancer 5 Yr. Prognosis*

| Method to induce multiple signatures | Number of signatures | Number of genes in a signature | | Classification performance (AUC) | | | |
|---|---|---|---|---|---|---|---|
| | | | | In discovery dataset | | In validation dataset | |
| | | mean | 95% interval | mean | 95% interval | mean | 95% interval |
| TIE* | 5342/5342/3321 | 84 | [81 - 89] | 0.671 | [0.658 - 0.686] | 0.697 | [0.674 - 0.720] |
| Resampling+ SVM-RFE1 | 5000/4755/42 | 4687 | [2 - 22283] | 0.684 | [0.541 - 0.746] | 0.64 | [0.487 - 0.752] |
| Resampling+ SVM-RFE2 | 5000/3407/350 | 56 | [1 - 404] | 0.586 | [0.413 - 0.719] | 0.598 | [0.398 - 0.822] |
| Resampling+ Univariate1 | 5000/4002/29 | 5791 | [1 - 22283] | 0.685 | [0.573 - 0.741] | 0.645 | [0.468 - 0.801] |
| Resampling+ Univariate2 | 5000/2573/139 | 44 | [1 - 162] | 0.62 | [0.467 - 0.712] | 0.628 | [0.411 - 0.807] |
| KIAMB1 | 986/552/550 | 14 | [14 - 14] | 0.596 | [0.507 - 0.693] | 0.562 | [0.399 - 0.716] |
| KIAMB2 | 988/969/955 | 28 | [27 - 29] | 0.595 | [0.482 - 0.708] | 0.562 | [0.390 - 0.713] |
| KIAMB3 | 1182/916/889 | 23 | [12 - 28] | 0.596 | [0.483 - 0.704] | 0.567 | [0.394 - 0.724] |
| Iterative Removal | 31/31/31 | 28 | [12 - 82] | 0.69 | [0.589 - 0.794] | 0.606 | [0.434 - 0.735] |

Fig.24B

*Glioma Subtype Classification*

| Method to induce multiple signatures | Number of signatures | Number of genes in a signature | | Classification performance (AUC) | | | |
|---|---|---|---|---|---|---|---|
| | | | | In discovery dataset | | In validation dataset | |
| | | mean | 95% interval | mean | 95% interval | mean | 95% interval |
| TIE* | 5753/5753/4588 | 46 | [45 - 53] | 0.871 | [0.860 - 0.885] | 0.844 | [0.830 - 0.860] |
| Resampling+ SVM-RFE1 | 5000/4255/43 | 301 | [2 - 3599] | 0.808 | [0.630 - 0.915] | 0.74 | [0.528 - 0.880] |
| Resampling+ SVM-RFE2 | 5000/2055/126 | 3 | [1 - 13] | 0.694 | [0.545 - 0.890] | 0.637 | [0.463 - 0.830] |
| Resampling+ Univariate1 | 5000/4751/63 | 925 | [2 - 17022] | 0.84 | [0.690 - 0.905] | 0.818 | [0.554 - 0.919] |
| Resampling+ Univariate2 | 5000/1926/117 | 3 | [1 - 15] | 0.74 | [0.495 - 0.900] | 0.65 | [0.450 - 0.860] |
| KIAMB1 | 973/658/654 | 15 | [15 - 15] | 0.765 | [0.675 - 0.865] | 0.71 | [0.558 - 0.811] |
| KIAMB2 | 974/964/964 | 30 | [29 - 30] | 0.781 | [0.685 - 0.880] | 0.732 | [0.610 - 0.832] |
| KIAMB3 | 1408/786/746 | 21 | [6 - 30] | 0.77 | [0.685 - 0.865] | 0.728 | [0.588 - 0.821] |
| Iterative Removal | 58/58/58 | 24 | [15 - 44] | 0.847 | [0.744 - 0.921] | 0.842 | [0.743 - 0.914] |

*Leukemia 5 Yr. Prognosis*

| Method to induce multiple signatures | Number of signatures | Number of genes in a signature | | Classification performance (AUC) | | | |
|---|---|---|---|---|---|---|---|
| | | | | In discovery dataset | | In validation dataset | |
| | | mean | 95% interval | mean | 95% interval | mean | 95% interval |
| TIE* | 1804/1804/1561 | 22 | [20 - 28] | 0.714 | [0.647 - 0.805] | 0.711 | [0.631 - 0.784] |
| Resampling+ SVM-RFE1 | 5000/4643/158 | 1984 | [1 - 8756] | 0.631 | [0.422 - 0.741] | 0.612 | [0.440 - 0.725] |
| Resampling+ SVM-RFE2 | 5000/2537/570 | 15 | [1 - 92] | 0.543 | [0.341 - 0.749] | 0.55 | [0.356 - 0.725] |
| Resampling+ Univariate1 | 5000/3897/116 | 4024 | [1 - 10507] | 0.649 | [0.431 - 0.756] | 0.606 | [0.419 - 0.717] |
| Resampling+ Univariate2 | 5000/2516/465 | 48 | [1 - 329] | 0.539 | [0.235 - 0.756] | 0.529 | [0.342 - 0.725] |
| KIAMB1 | 988/984/984 | 31 | [29 - 31] | 0.515 | [0.351 - 0.681] | 0.603 | [0.445 - 0.735] |
| KIAMB2 | 1213/1131/1127 | 46 | [13 - 56] | 0.517 | [0.341 - 0.687] | 0.602 | [0.460 - 0.732] |
| KIAMB3 | 4485/30/30 | 7 | [6 - 10] | 0.438 | [0.348 - 0.632] | 0.563 | [0.530 - 0.760] |
| Iterative Removal | 2/2/2 | 21 | [19 - 23] | 0.673 | [0.630 - 0.716] | 0.652 | [0.550 - 0.753] |

Fig.24C

| Dataset name | Domain | Num. vars. | Num. sample | Response variable | Data type | Cross-val. design | Discretization applied | Notes | Ref. |
|---|---|---|---|---|---|---|---|---|---|
| Infant_Mortality | Clinical | 86 | 5,337 | Died within the first year | Discrete | 1-fold cross-val. | Already discrete | Imputed by nearest neighbor method | (Mani and Cooper, 1999) |
| Ohsumed | Text | 14,373 | 5,000 | Relevant to neonatal diseases | Continuous | 1-fold cross-val. | Word absent/present | | (Joachims, 2002) |
| ACPJ_Etiology | Text | 28,228 | 15,779 | Relevant to etiology | Continuous | 1-fold cross-val. | Word absent/present | | (Aphinyanaphongs et al., 2006) |
| Lymphoma | Gene expression | 7,399 | 227 | 3-year survival: dead vs. alive | Continuous | 10-fold cross-val. | Binary/ternary univariate; used window sizes 10,15, 20, 25, 30 for ternary | | (Rosenwald et al., 2002) |
| Gisette | Digit recognition | 5,000 | 7,000 | Separate 4 from 9 | Continuous | 1-fold cross-val. | Pixel present/absent | Used original training & validation sets only | NIPS 2003 Feature Selection Challenge (Guyon et al., 2006) |
| Dexter | Text | 19,999 | 600 | Relevant to corporate acquisitions | Continuous | 10-fold cross-val. | Word absent/present | Used original training & validation sets only | NIPS 2003 Feature Selection Challenge (Guyon et al., 2006) |

Fig.25A

| Dataset name | Domain | Num. vars. | Num. sample | Response variable | Data type | Cross-val. design | Discreti-zation applied | Notes | Ref. |
|---|---|---|---|---|---|---|---|---|---|
| Sylva | Ecology | 216 | 14,394 | Ponderosa pine vs. everything else | Continuous & discrete | 1-fold cross-val. | Binary/ternary univariate: used window sizes 1000, 1500, 2000, 2500, 3000 for ternary | Used original training & validation sets only | WCCI 2006 Performance Prediction Challenge |
| Ovarian_Cancer | Proteomics | 2,190 | 216 | Cancer vs. normals | Continuous | 10-fold cross-val. | Binary/ternary univariate; used window sizes 10, 15, 20, 25, 30 for ternary | | (Conrads et al., 2004) |
| Throm-bin | Drug discovery | 139,351 | 2,543 | Binding to thrombin | Discrete (binary) | 1-fold cross-val. | Already discrete | | KDD Cup 2001 |
| Breast_Cancer | Gene expression | 17,816 | 286 | Estrogen-receptor positive (ER+) vs. ER- | Continuous | 10-fold cross-val. | Binary/ternary univariate, used window sizes 10, 15, 20, 25, 30 for ternary | | (Wang et al., 2005) |
| Hiva | Drug discovery | 1,617 | 4,229 | Activity to AIDS HIV infection | Discrete (binary) | 1-fold cross-val. | Already discrete | Used original training & validation sets only | WCCI 2006 Performance Prediction Challenge |

Fig.25B

| Dataset name | Domain | Num. vars. | Num. sample | Response variable | Data type | Cross-val. design | Discreti-zation applied | Notes | Ref. |
|---|---|---|---|---|---|---|---|---|---|
| Nova | Text | 16,969 | 1,929 | Separate politics from religion topics | Discrete (binary) | 1-fold cross-val. | Already discrete | Used original training & validation sets only | WCCI 2006 Performance Prediction Challenge |
| Bank-ruptcy | Financial | 147 | 7,063 | Personal bankruptcy | Continuous & discrete | 1-fold cross-val. | Binary/ternary univariate, used window sizes 1000, 1500, 2000, 2500, 3000 for ternary | Imputed by nearest neighbor method | (Foster and Stine, 2004) |

Fig.25C

COMPUTER IMPLEMENTED METHOD FOR DETERMINING ALL MARKOV BOUNDARIES AND ITS APPLICATION FOR DISCOVERING MULTIPLE MAXIMALLY ACCURATE AND NON-REDUNDANT PREDICTIVE MODELS

Benefit of U.S. Provisional Application No. 61/110,487 filed on Oct. 31, 2008 is hereby claimed.

BACKGROUND OF THE INVENTION

1. Field of the Invention

Methods for Markov boundary discovery constitute one of the most important recent developments in pattern recognition and applied statistics, primarily because they offer a principled solution to the variable/feature selection problem and give insight about local causal structure. The present invention is a novel method to discover all Markov boundaries of the response variable. The power of the inventive method is first demonstrated by its application to the bioinformatics and biotechnology domain, where the invention can identify the set of maximally accurate and non-redundant predictive models (molecular signatures) of the phenotype/response variable and predictor variable sets that participate in those models. The broad applicability of the invention is subsequently demonstrated with 13 real datasets from a diversity of application domains, where the invention can efficiently identify multiple Markov boundaries of the response variable.

2. Description of Related Art

The problem of variable/feature selection is of fundamental importance in pattern recognition and applied statistics, especially when it comes to analysis, modeling, and discovery from high-dimensional data (Guyon and Elisseeff, 2003; Kohavi and John, 1997). In addition to the promise of cost-effectiveness, two major goals of variable selection are to improve the prediction performance of the predictors and to provide a better understanding of the data-generative process (Guyon and Elisseeff, 2003). An emerging class of methods proposes a principled solution of the variable selection problem by identification of a Markov blanket of the response variable of interest (Aliferis et al., 2009a; Aliferis et al., 2003; Tsamardinos and Aliferis, 2003; Tsamardinos et al., 2003). The Markov blanket is a set of variables conditioned on which all the remaining variables excluding the response variable are statistically independent of the response variable. Under assumptions about the learner and loss function, Markov blanket is the solution of the variable selection problem (Tsamardinos and Aliferis, 2003). A related useful concept is Markov boundary or non-redundant Markov blanket (abbreviated as "MB" in this patent document) that is a Markov blanket such that no proper subset of it is a Markov blanket[1].

An important theoretical result states that if the distribution satisfies the intersection property of probability theory, then it is guaranteed to have a unique Markov boundary of the response variable (Pearl, 1988). However, many real-life distributions contain multiple Markov boundaries and violate the intersection property. For example, a phenomenon ubiquitous in analysis of high-throughput molecular data, known as the "multiplicity" of predictive models (molecular signatures) and predictor variable sets in those models (i.e., several different signatures and markers perform equally well in terms of predictive accuracy of phenotypes) (Azuaje and Dopazo, 2005; Somorjai et al., 2003), suggests existence of multiple Markov boundaries in these distributions.

There are at least two practical benefits of a method that could systematically discover all Markov boundaries of the response variable of interest: First, the method allows improving discovery of the underlying mechanisms by not missing causative variables. Second, the method sheds light on the predictive model (molecular signature) multiplicity phenomenon and how it affects the reproducibility of predictive models.

Even though there are several well-developed methods for discovering a Markov boundary (Aliferis et al., 2009a; Aliferis et al., 2003; Tsamardinos et al., 2003), little research has been done in development of methods for identification of multiple Markov boundaries. Most notable advances in the field are described in the next paragraphs. In summary, there are currently no computationally efficient methods that can correctly identify all Markov boundaries from the data.

The following paragraphs provide a description of the related art with specific reference to application of the invention to the molecular signature multiplicity problem.

A "molecular signature" is a model that predicts a response variable of interest (e.g., diagnosis or outcome of treatment in human patients or biological models of disease) from microarray gene expression or other high-throughput assay data inputs (Golub et al., 1999; Ramaswamy et al., 2003). "Multiplicity" is the phenomenon in which different analysis methods used on the same data, or different samples from the same population lead to different but apparently maximally accurate predictive models (signatures) (Azuaje and Dopazo, 2005; Somorjai et al., 2003). This phenomenon has far-reaching implications for biological discovery and development of next generation patient diagnostics and personalized treatments. Multiplicity in the best case implies that generation of biological hypotheses (e.g., discovery of potential drug targets) is very hard even when predictive models (signatures) are maximally accurate for the prediction of phenotype, since thousands of completely different predictive models are equally consistent with the data. In the worst case this phenomenon may be due to large extent to statistical instability and thus entail that the produced predictive models (signatures) are not statistically generalizable to new cases and/or not reliable enough for translation to clinical practice.

Indeed some authors motivated by classical statistical considerations, attribute predictive model (signature) multiplicity solely to the small sample size of typical microarray gene expression studies (Ein-Dor et al., 2006) and have conjectured that it leads to non-reproducible predictive accuracy when the signatures are applied in independent data (Michiels et al., 2005). Related to the above it has been suggested that building reproducible predictive models (signatures) requires thousands of observations (Ioannidis, 2005). Other authors have counter-observed that the phenomenon of predictive model (signature) multiplicity is a byproduct of the complex regulatory connectivity of the underlying biological system leading to existence of highly predictively redundant biomarker sets (Dougherty and Brun, 2006). The specifics of what types of connectivity or regulatory relationships may lead to multiplicity have not been concretely identified. Another possible explanation of predictive model (signature) multiplicity is implicit in previously described artifacts of data pre-processing. For example, normalization may inflate correlations between genes, making some of them interchangeable for prediction of the phenotype (Gold et al., 2005; Ploner et al., 2005; Qiu et al., 2005).

Critical to the ability to study the phenomenon empirically is the availability of methods capable of discovering from the data multiple predictive models (signatures) and predictor variable sets that participate in those models. Several methods have been introduced with this intent. The available methods encompass four method families. The first method family is "resampling-based predictive model (signature) discovery." This method family operates by repeated application of a predictive model (signature) discovery method to resampled data (e.g., via bootstrapping) (Ein-Dor et al., 2005; Michiels et al., 2005; Roepman et al., 2006). This family of methods is based on the assumption that multiplicity is strictly a small sample phenomenon. The second method family is "iterative removal", that is, repeating predictive model (signature) discovery after removing from the data all variables that have been found in the previously discovered predictive models (molecular signatures) (Natsoulis et al., 2005). This approach is agnostic as to what causes multiplicity and heuristic since it does not propose a theory of causes of multiplicity. The third method family is "stochastic variable selection" techniques (Li et al., 2001; Peña et al., 2007). The underlying premise of the method of (Peña et al., 2007) is that in a specific class of distributions every maximally accurate and non-redundant predictive model (signature) will be output by a randomized method with non-zero probability; thus all such predictive models (signatures) will be output when the method is applied an infinite number of times. Similarly, the method of (Li et al., 2001) will output all predictive models (signatures) discoverable by a genetic algorithm when it is allowed to evolve an infinite number of populations. The fourth family is "brute force exhaustive search" (Grate, 2005). This approach is also agnostic as to what causes multiplicity, requires exponential time to the total number of variables, and thus is computationally infeasible for predictive models (signatures) with more than 2-3 variables (as almost all maximally accurate predictive models are in practice).

The above methods, are either heuristic or computationally intractable. They are based on currently unvalidated conjectures about what causes multiplicity, and they output incomplete sets of predictive models (signatures) with currently unknown generalizability. In the fields of bioinformatics and biotechnology, the practical benefits of a method that could systematically discover the set of truly maximally accurate and non-redundant predictive models (signatures) include: (i) a deeper understanding of the predictive model (signature) multiplicity phenomenon and how it affects reproducibility of predictive models; (ii) improving discovery of the underlying mechanisms by not missing variables that are implicated mechanistically in the disease processes; and (iii) facilitating the process of regulatory approval by establishing "in-silico equivalence" to previously validated predictive models (signatures) in a manner similar to bioequivalence of drugs, at the time of developing predictive models (molecular signatures) and predictor variable sets (biomarker panels) from one or more datasets.

DESCRIPTION OF THE FIGURES AND TABLES

FIG. 1 shows an example pathway structure with 3 gene variables (A, B, C) and phenotypic response variable T (top) and constraints on its parameterization (bottom). Genes A, B and phenotypic variable T take 3 values $\{0, 1, 2\}$, while gene C takes two values $\{0, 1\}$. The dashed lines denote nonzero conditional probabilities of each variable given its direct causes. For example, $P(T=0|A=1) \neq 0$ while $P(T=0|A=2)=0$.

FIG. 2 shows the generative method TIE*.

FIG. 3 shows an example of instantiated TIE* method for gene expression data analysis.

FIG. 4 shows admissibility rules for inputs X, Y, Z of the TIE* method.

FIG. 5 shows Markov boundary discovery method IAMB.

FIG. 6 shows Markov boundary discovery method HITON-PC (without "symmetry correction").

FIG. 7 shows strategies INCLEX, INCMINASSOC, and INCMAXASSOC to generate subsets of variables that have to be removed from V to identify new Markov boundaries of T. "INC" in the name of the strategy stands for incremental generation of subsets; "LEX" stands for lexicographical order; "MINASSOC" stands for minimal association with T; and "MAXASSOC" stands for maximal association with T.

FIG. 8 shows criterion INDEPENDENCE to verify Markov boundaries.

FIG. 9 shows criterion PREDICTIVITY to verify Markov boundaries.

Figure 10:
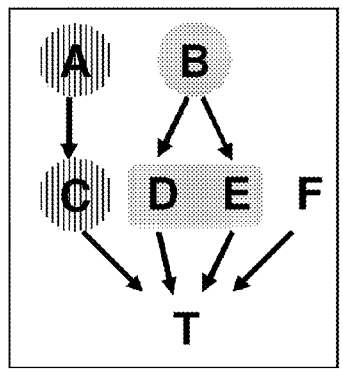

FIG. 10 shows graph of a Bayesian network used to trace TIE* method. The network parameterization is provided below the graph. The response variable is T. All variables take values $\{0, 1\}$ except for B that takes values $\{0, 1, 2\}$. Variables A and C contain exactly the same information about T and are shown with the same filling pattern. Likewise, two variables $\{D, E\}$ jointly and a single variables B contain exactly the same information about T and thus are also shown with the same filling pattern.

Figure 11:
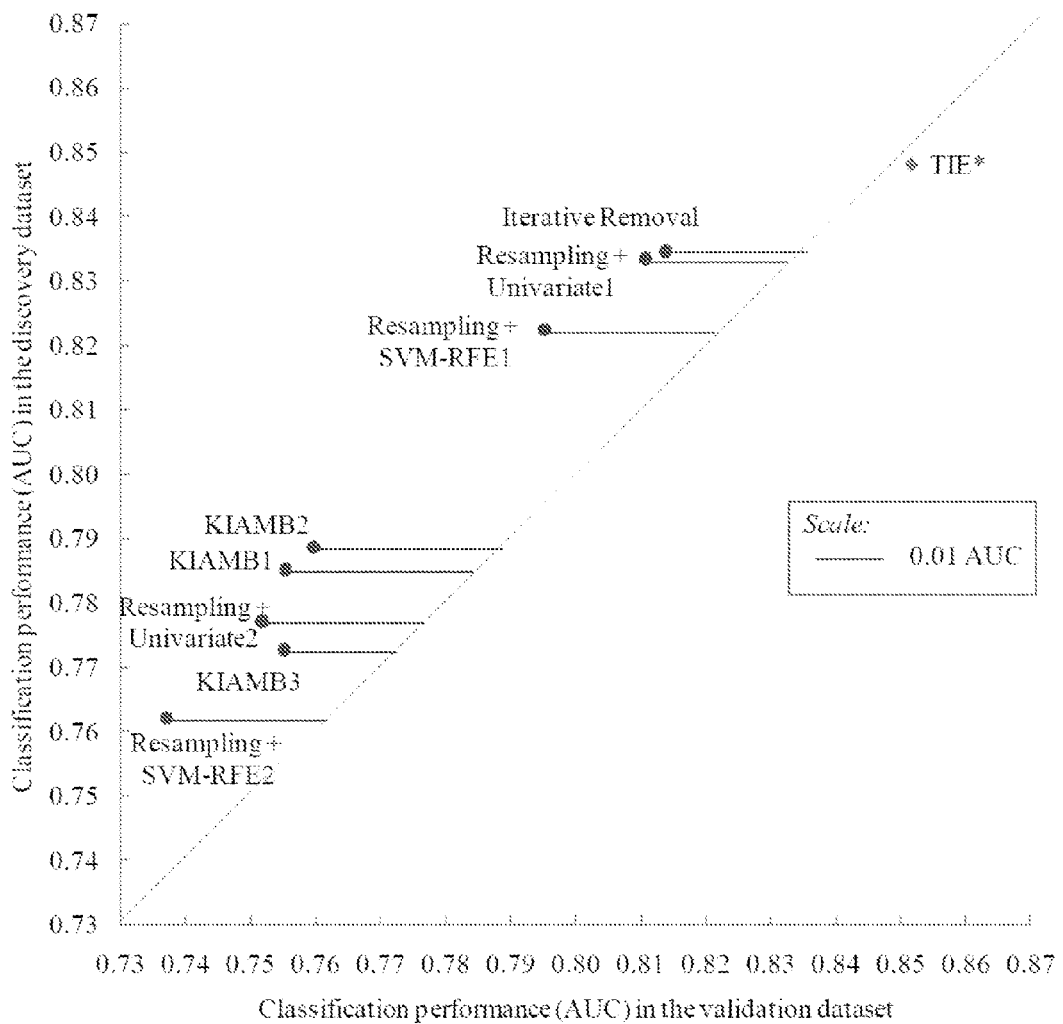

FIG. 11 shows plot of classification performance (AUC) in the validation dataset versus classification performance in the discovery dataset averaged over 6 pairs of datasets. Axes are magnified for better visualization.

Figure 12:
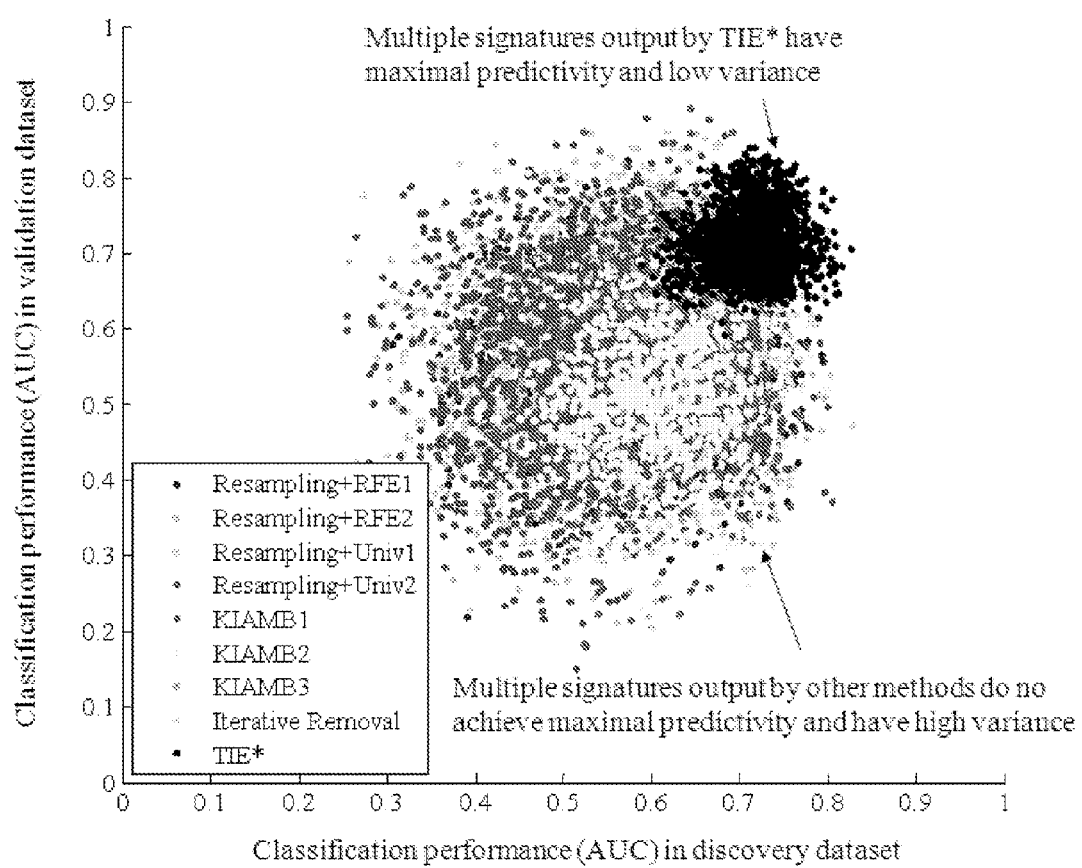

FIG. 12 shows plot of classification performance (AUC) in the validation dataset versus classification performance in the discovery dataset for each predictive model (signature) output by each method for the Leukemia 5 yr. Prognosis task. Each dot in the graph corresponds to a signature (SVM predictive model of the phenotype).

Figure 13:
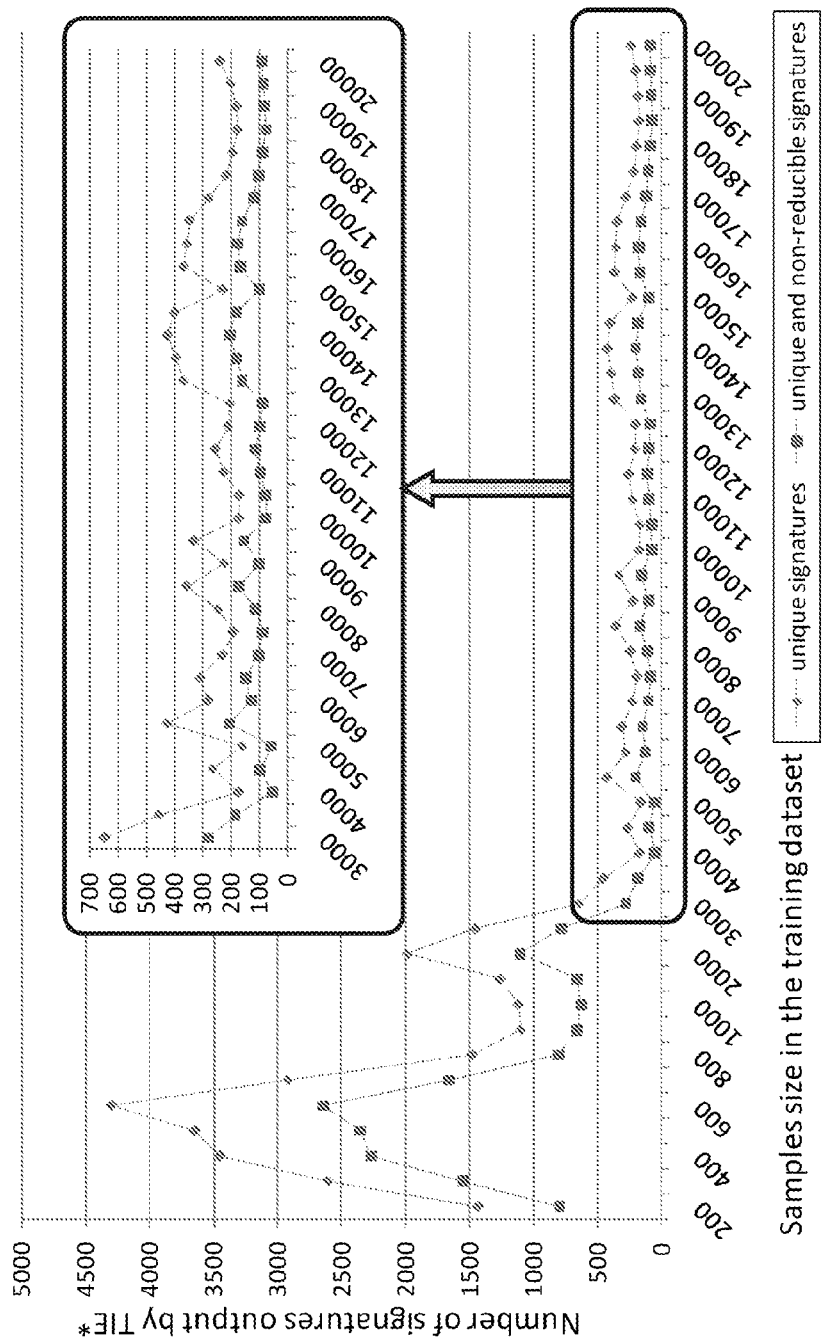

FIG. 13 shows number of predictive models (signatures) output by TIE* as sample size grows. The inner figure is a magnified region of the main figure.

Figure 14:
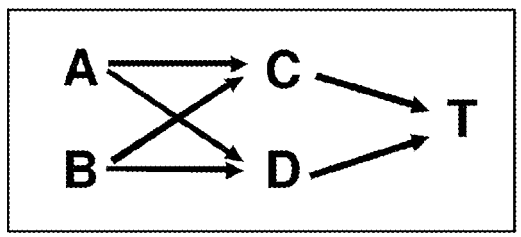

FIG. 14 shows example network structure with 4 variables (A, B, C, D) and phenotypic response variable T used to illustrate multiplicity due to small sample sizes. All variables take values $\{0,1\}$. The probability distribution is defined below the structure.

Figure 15:
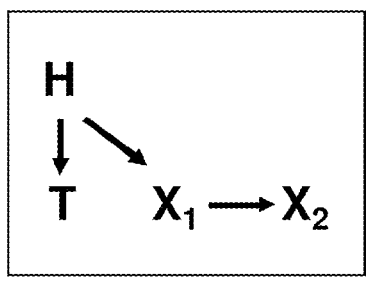

FIG. 15 shows example network structure with 3 variables $(H, X_1, X_2)$ and phenotypic response variable T used to illustrate multiplicity due to hidden variables. All variables take values $\{0,1\}$. The probability distribution is defined below the structure.

Figure 16:
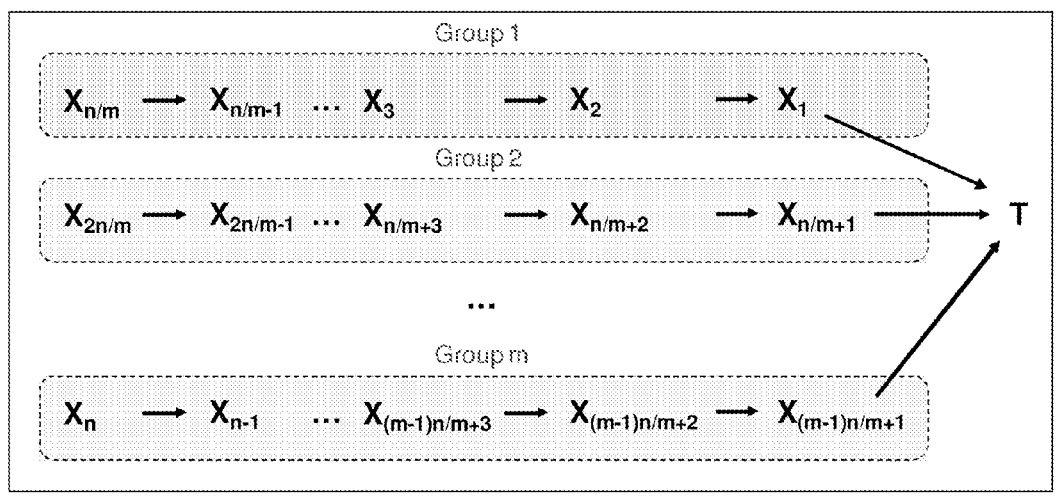

FIG. 16 shows example network structure with n variables $(X_1, X_2, \ldots, X_n)$ and phenotypic response variable T used to demonstrate that the number of maximally accurate and non-redundant predictive models (signatures) can be exponential to the number of variables. All variables take values $\{0,1\}$. The probability distribution is defined below the structure.

Figure 17:
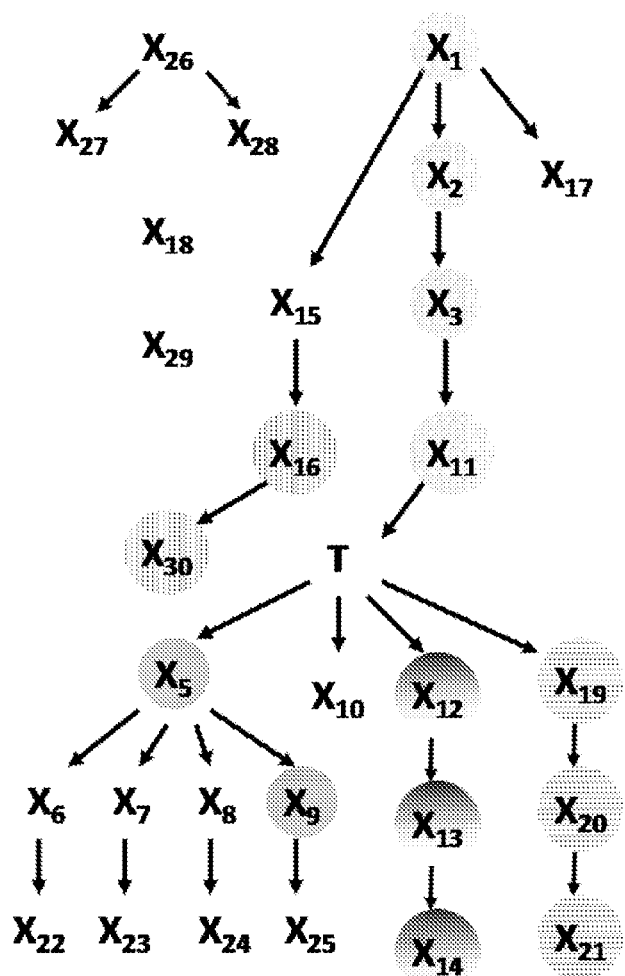

FIG. 17 shows graphical visualization of an artificial network with 30 variables (29 variables and phenotypic variable T). Variables that contain exactly the same information about T are shown with the same filling pattern, e.g. variables $X_{12}$, $X_{13}$, and $X_{14}$ provide exactly the same information about T and thus are interchangeable for prediction of T.

Figure 18:
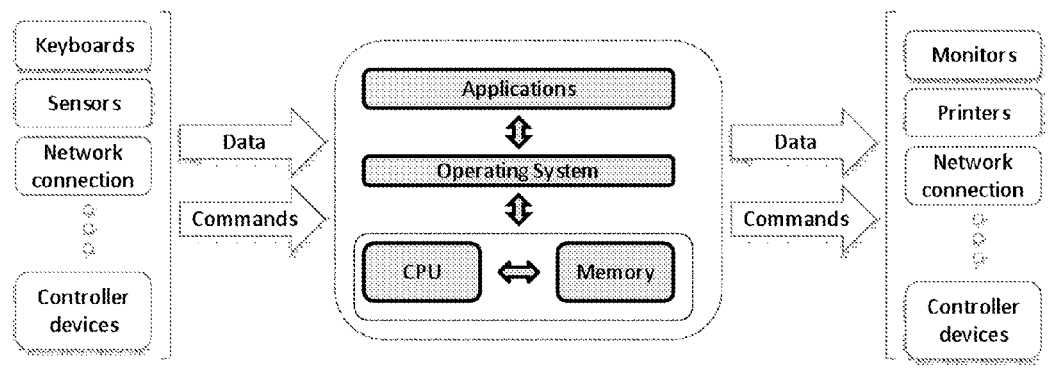

FIG. 18 shows a high level architecture of a digital computer system used with the invention along with the interactions/data flow to and fro input/output devices.

Figure 19:
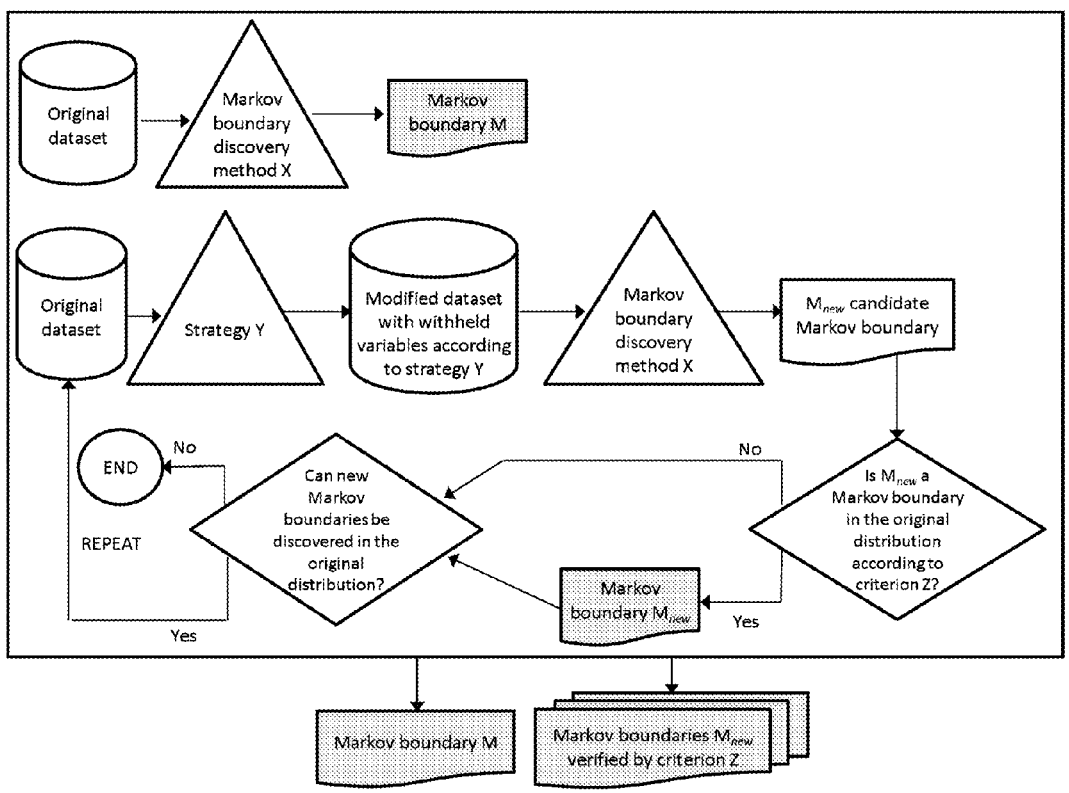

FIG. 19 shows the method of claim 1 in a pseudo flow sheet format highlighting the main steps of the method.

Table 1 shows results of applying the TIE* method in additional 13 real datasets. TIE* was executed with the INDEPENDENCE criterion to verify Markov boundaries. The parameters of HITON-PC were selected to optimize AUC of the SVM classifier by cross-validation as described in (Aliferis et al., 2009a; Aliferis et al., 2009b). The statistical comparison of the AUC estimates was performed using Delong's test with alpha=0.05 (DeLong et al., 1988).

Tables 2A and 2B show gene expression microarray datasets used in the experiments reported in this patent document.

Table 3 shows results of experiments with artificial dataset with 30 variables. 72 true maximally accurate and non-redundant predictive models (signatures) exist in this dataset.

Table 4 shows results of experiments with artificial dataset with 1,000 variables. 72 true maximally accurate and non-redundant predictive models (signatures) exist in this dataset.

Tables 5A, 5B, and 5C show results for the number of output predictive models (signatures) (total/unique/unique and non-reducible), number of genes in a signature, and classification performance in discovery and validation microarray datasets. The length of highlighting corresponds to magnitude of the value (number of genes in a signature or classification performance) relative to other multiple signature discovery methods. The 95% intervals correspond to the observed [2.5-97.5] percentile interval over multiple signatures discovered by the method. Uniqueness and non-reducibility of each signature is assessed relative to the corresponding signature discovery method.

Tables 6A, 6B, and 6C show a list of 13 real datasets used in experiments to evaluate TIE*.

DETAILED DESCRIPTION OF THE INVENTION

This specification provides a general process and an implemented novel method (TIE*) for identification of all and only Markov boundaries (and by extension all maximally accurate and non-redundant predictive models and predictor variable sets that participate in those models) that are consistent with the data distribution and the process that generates the data distribution. This method can be applied to any type of dataset, independent of the distribution family. Experimental results are presented with real and resimulated microarray gene expression datasets, real datasets from different application domains, as well as with artificial simulated data that verify the theoretical properties of the TIE* method and showcase its advantages over previous methods. In particular, it is shown that the TIE* method, having excellent sample and computational efficiency, not only discovers many more maximally accurate and non-redundant predictive models (signatures) than all other previously known methods, but also TIE* models and their predictor variables reproduce in independent datasets whereas models and predictor variables produced by previous methods are often not reproducible (i.e., they are overfitted or underfitted). In experiments with 13 real datasets from different domains, it is shown that TIE* can efficiently discover multiple Markov boundaries of the response variable.

Relevant notation and key definitions are set forth at the beginning of the Appendix.

Software and Hardware Implementation:

Due to the large numbers of data elements in the datasets, which the present invention is designed to analyze, the invention is best practiced by means of a computational device. For example, a general purpose digital computer with suitable software program (i.e., hardware instruction set) is needed to handle the large datasets and to practice the method in realistic time frames. Based on the complete disclosure of the method in this patent document, software code to implement the invention may be written by those reasonably skilled in the software programming arts in any one of several standard programming languages. The software program may be stored on a computer readable medium and implemented on a single computer system or across a network of computers linked to work as one. The inventors have used Mathworks Matlab and a personal computer with an Intel Xeon CPU 1.8-2.4 GHz with 4 GB of RAM and 160 GB hard disk. In the most basic form, the invention receives on input a dataset and a response variable index corresponding to this dataset, and outputs all Markov boundaries (described by indices of variables in this dataset) which can be either stored in a data file, or stored in computer memory, or displayed on the computer screen.

FIG. 18 shows a high level architecture of a digital computer system used with the invention along with the interactions/data flow to and fro input/output devices.

Principles Underlying the Invention:

Understanding the statistical principles underlying the invention is not needed in order to implement or use the invention. However the principles are useful for the proofs of correctness of the invention (Statnikov, 2008) and for interpreting experimental results and thus are discussed here. In summary the key principles are four: (1) A reduction is used of infinite numbers of predictive models to a finite number of reference predictor variables subsets. (2) Only maximally accurate and non-redundant predictive models are of interest and thus sought. (3) Predictive model multiplicity is due to certain characteristics of the underlying probability distribution of the data generative causal process. (4) Thus, small sample size and high variable connectivity (in the data generative causal process), and reduced generalizability of models are not necessarily causing or caused by the multiplicity of predictive models.

To simplify understanding of the invention, without loss of generality, the principles underlying the invention are explained in the context of gene expression molecular signatures and biomarkers (i.e., genes) therein. As a starting point instead of discovering or studying all possible signatures derivable from a given dataset (via a potentially infinite variety of classifier or regression methods), only the signatures that have maximal accuracy for prediction of the phenotypic response variable relative to the genes (predictor variables) contained in each signature are considered. In other words, excluded from consideration are signatures that do not utilize all predictive information about the phenotypic response variable contained in their genes. This allows the study of signature classes by reference only to the genes contained in each class. Specifically, for a gene set X there can be an infinite number of classifiers or regression models that achieve maximal accuracy for the prediction of phenotype relative to the information contained in X. Thus, by "signature X" reference is made to one of these predictively equivalent classifiers or regression models. This reduction is justified, for example, whenever the classifiers or regression methods used can learn the minimum error decision function[2] given sufficient sample. Most practical classifiers employed in this domain as well as classifiers used in the experiments (SVMs) satisfy the above requirement either on theoretical (Hammer and Gersmann, 2003; Shawe-Taylor and Cristianini, 2004) and/or empirical grounds (Furey et al., 2000).

Given the above reduction of predictive models (signatures) to equivalence classes defined by the sets of predictor variables, the focus of this invention is discovering signatures that satisfy two desirable optimality properties: they are (a) maximally accurate for prediction of the phenotype (informally this means that they can form the inputs to a predictive model of the phenotype which for the given dataset and population cannot be improved by any other learner-gene subset combination), and at the same time they (b) do not contain predictively redundant genes (predictor variables) (i.e., genes that can be removed from the signature without adversely affecting the signature predictive accuracy). Every suboptimal signature (i.e., one that does not satisfy these two properties) can be discarded from consideration.

As proven in (Statnikov, 2008) two signatures X and Y of the phenotypic response variable T are maximally accurate and non-redundant if and only if X and Y are Markov boundaries of T. A Markov boundary M of T is a set of variables that (i) renders all other variables outside M and T independent of T conditioned on M (i.e., M is a Markov blanket of T) and (ii) no proper subset of M is a Markov blanket of T (Pearl, 1988). This definition also implies causal interpretability of M under distributional assumptions (Guyon et al., 2007; Pearl, 2000; Pearl, 1988; Tsamardinos and Aliferis, 2003). It was shown previously that the so-called "intersection property" of probability distributions is a sufficient condition for uniqueness of Markov boundaries (Pearl, 1988), therefore it is also a sufficient condition for uniqueness of optimal predictive models (molecular signatures).

Figure 1:
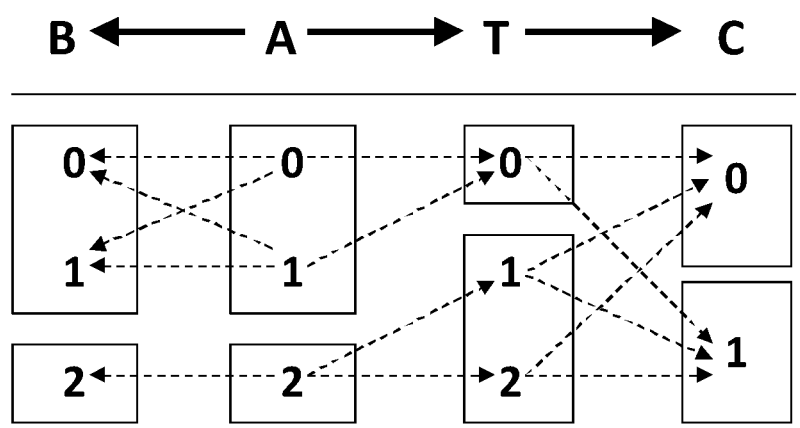

FIG. 1 shows by means of an illustrative example the remaining principles that underlie the invention. It describes a class of generative function modeled (without loss of generality) in the formalism of Bayesian networks that share the same pathway structure (with three gene variables A, B, C and a phenotypic response variable T) and constraints on their joint probability distributions. Each member of this class is derived by parameterizing the joint probability distribution subject to the constraints. The following properties hold in all Bayesian network models that belong to this example class: (a) There exist two maximally accurate and non-redundant signatures (Markov boundaries) of T: {A, C} and {B, C}. Furthermore, {A, C} and {B, C} remain maximally accurate and non-redundant signatures even in infinite samples from that distribution (i.e., multiplicity does not vanish in the large sample); (b) The pathway structure has very low connectivity (e.g., max in-degree=1 and max out-degree=2) (i.e., multiplicity does not require very dense connectivity); (c) A and B are not deterministically related, yet they convey individually the same information about T (i.e., multiplicity does not require deterministic equivalence or extreme colinearity); (d) If a method selects only one maximally accurate and non-redundant signature (e.g., {B, C}), then there is danger to miss biologically important (causative) genes (i.e., A) and focus instead on confounded genes (i.e., B) (i.e., only some of the predictively equivalent signatures have local causal interpretation); (e) The union of all maximally accurate and non-redundant signatures includes all genes located in the "local pathway"[3] around T (i.e., A and C); (f) In this example, the intersection of all maximally accurate and non-redundant signatures contains only genes in the local pathway around T (i.e., C). The above illustrative example is concerned with the large sample case. In real world practice, small samples are encountered where statistical inferences have to be made about large sample predictive accuracy and redundancy. This creates an additional source of error and concomitant multiplicity. An example of this is given in the Appendix.

TIE* Method for Identification of all Markov Boundaries (with Application for Discovering all Maximally Accurate and Non-Redundant Signatures and Biomarkers Therein):

The most general disclosure of the steps in the TIE* method is provided in FIG. 20 FIG. 19 shows the method of claim 1 in a pseudo flow sheet format highlighting the main steps in the method. The Appendix provides implementation details of the method. TIE* is a generative method that is instantiated differently for different distributions (an example of an instantiated TIE* method for gene expression data analysis is provided in FIG. 3).

As shown in FIG. 2, the following inputs are provided: (i) a dataset D (a sample drawn at random from distribution P) for variables V, including a response variable T; (ii) a single Markov boundary induction method X; (iii) a strategy Y to generate subsets of variables that have to be removed from V to identify new Markov boundaries of T; and (iv) a criterion Z to verify Markov boundaries of T. The input components X, Y, and Z are selected to be suitable for the distribution in hand and should satisfy admissibility rules stated in FIG. 4 in order for the method to be correct. The TIE* method when the admissibility requirements hold is guaranteed theoretically to output all Markov boundaries of T (i.e., all maximally accurate and non-redundant predictive models and predictor variable sets that participate in those models) (Statnikov, 2008).

In step 1, the TIE* method uses a single Markov boundary method X to learn a Markov boundary M of T from data D for variables V (i.e., in the "original" distribution). Then M is output in step 2. In step 3, an iterative loop is initiated. In step 4, the TIE* method applies the strategy Y to generate a subset G whose removal may lead to identification of a new Markov boundary of T. Next, in step 5 the Markov boundary method X is applied to a modification of dataset D in which the subset of variables G has been removed (this is referred to as an "embedded" distribution), resulting in a Markov boundary $M_{new}$ in the embedded distribution. In step 6, if $M_{new}$ is also a Markov boundary of T in the original distribution according to criterion Z, then $M_{new}$ is output. The loop in steps 3-7 is repeated until all subsets G generated by strategy Y have been considered. The TIE* method outputs all and only Markov boundaries M of T as long as the admissibility criteria of FIG. 4 hold (Statnikov, 2008).

Two examples of Markov boundary method inputs X, that may be used with the TIE* method in steps 1 and 5 (FIG. 2) are shown in FIGS. 5 and 6. These are termed IAMB and HITON-PC respectively. Those skilled in the art will recognize additional methods that could be used.

FIG. 7 gives examples of three strategy inputs Y, that may be used to generate subsets of variables in step 4 of the TIE* method (FIG. 2). These are termed INCLEX, INCMINASSOC, and INCMAXASSOC. Other strategies may be also derived by those skilled in the art.

FIGS. 8 and 9 show two different criteria Z that can be used in step 6 of the TIE* method (FIG. 2) to verify Markov boundaries. Additional methods may be also used as long as they satisfy the admissibility requirements.

An illustrative example of the application of the TIE* method (i.e., trace of execution) follows. As an example, the TIE* method was applied to data D generated from an example generative process modeled by the Bayesian network shown in FIG. 10. The response variable T is caused by C, D, E, and F. The underlying distribution is such that variables A and C contain exactly the same information about T; likewise two variables {D, E} jointly and a single variable B contain exactly the same information about T. In step 1 of TIE* (FIG. 2), a Markov boundary method X is applied to learn a single Markov boundary of T: M={A, B, F}. Then M is output in step 2. Step 3 initiates the loop. In step 4, the strategy Y generates a subset G={F}, the removal of which is intended to lead to identification of a new Markov boundary of T. Then in step 5 the Markov boundary method X is run on data D for all variables except for F (i.e., it is run on the "embedded distribution"). This yields a Markov boundary of T in the embedded distribution $M_{new}$={A, B}. The criterion Z in step 6 is applied and in this example step does not confirm that $M_{new}$ is also a Markov boundary of T in the original distribution; thus $M_{new}$ is not output. The iteration loop begins again. In step 4 the strategy Y generates another subset G={A}. The Markov boundary method X in step 5 yields a Markov boundary of T in the embedded distribution $M_{new}$={C, B, F}. The criterion Z in step 6 confirms that $M_{new}$ is also a Markov boundary in the original distribution, thus it is output. Similarly, when the Markov boundary method X is run on data D for all variables except for G={B} or for G={A, B}, two more Markov boundaries of T in the original distribution, {A, D, E, F} or {C, D, E, F}, are found and output, respectively. The TIE* method is continued until Y cannot produce any more subsets. In total, four Markov boundaries of T are output by the TIE* method: {A, B, F}, {C, B, F}, {A, D, E, F} and {C, D, E, F}. This is exactly the set of all Markov boundaries of T that exist in this distribution.

The TIE* method is guaranteed to be correct in a large sample under its stated assumptions (Statnikov, 2008). In a small sample some predictive models (signatures) that are not maximally accurate and/or redundant will be statistically indistinguishable from maximally accurate and non-redundant ones. This indistinguishability occurs at two different levels: one is estimating predictive accuracy and testing for statistical significance of differences in accuracy among signatures. The second level is performing tests of conditional independence (or functional equivalents such as Bayesian scoring) with small sample inside the base method X which incurs errors of type I and II. When the sample size is large enough to make correct decisions in both cases, the TIE* method will output only true maximally accurate and non-redundant signatures. Mathematical proofs of correctness for TIE* are provided in (Statnikov, 2008).

The results of several experiments are presented below where the TIE* method is applied and compared to 8 previously known multiple predictive model (signature) discovery methods. These baseline comparator methods encompass four resampling-based methods, one iterative removal method, and three stochastic variable selection methods (details in the Appendix).

Before applying the TIE* method to real data, its performance was tested in simulated and resimulated data where generative models are known and in the case of simulated data all optimal predictive models (signatures) are known as well. This provided a test of whether the method behaves according to theoretical expectations, whether it is robust to small sample sizes, and whether it is sensitive to high dimensionality.

The Appendix gives details about generation of artificial simulated data (where all maximally accurate and non-redundant predictive models are known) and resimulated microarray gene expression data (that resemble real gene expression data to good approximation).

To test reproducibility of predictive models (molecular signatures) for real world bioinformatics and biotechnology data, a cross-dataset design was adopted where one microarray dataset ("discovery dataset") is used for identification of predictive models (signatures) and estimation of their predictive accuracy by cross-validation, and another independent dataset ("validation dataset") originating either from a different laboratory or from a different microarray platform is used for validation of predictive accuracy of the signatures. No overlap of subjects between discovery and validation dataset analyses occurs in this design. The criteria for dataset admissibility and exact protocol for quality assurance and processing of pairs of datasets is described in the Appendix. In total, 6 pairs of gene expression microarray datasets covering both human cancer diagnosis and outcome prediction were used (listed in Tables 2A and 2B). Operationally, maximal predictive accuracy is defined to be the highest area under ROC curve achieved by any method in each dataset, on average over all identified signatures. Statistical comparisons of predictive accuracy between methods in the same dataset are accomplished by Wilcoxon rank sum test with $\alpha$=0.05 (Hollander and Wolfe, 1999).

Results of Experiments with Artificial Simulated Data:

Tables 3 and 4 present results of experiments with the TIE* method and baseline comparison methods. The following are observed: (i) the TIE* method perfectly identifies all 72 maximally accurate and non-redundant predictive models (signatures) in the datasets with either 30 or 1,000 variables; (ii) iterative removal identifies only 1 predictive model (signature) because all other predictive models (signatures) have common variables and thus cannot be detected by this method; (iii) KIAMB fails to identify any true predictive model (signature) due to its sample inefficiency, and because of the same reason its predictive models (signatures) have poor classification performance; (iv) resampling-based methods either miss many true predictive models (signatures) and/or output many redundant variables as predictors.

Results of Experiments with Resimulated Gene Expression Microarray Data:

The TIE* method was applied to resimulated gene expression data with sample sizes: 100, 200, . . . , 1000, 1500, 2000, . . . , 20,000. The number of unique predictive models (signatures) and the number of unique non-reducible[4] predictive models (signatures) discovered by the method for each sample size is shown in FIG. 13. All discovered predictive models (signatures) were maximally accurate for prediction of the response variable in the independent datasets. As sample size increases, the number of output predictive models (signatures) drops but then remains constant in the range 160-644 (or 53-279 for non-reducible signatures) for datasets with ≥3,000 samples. This result for the first time empirically demonstrates the existence of two sources of multiplicity: one source is due to small sample size and the other source is multiplicity intrinsic to the distribution. As sample size grows, the first source vanishes and only the second one remains. Since the resimulated data distribution closely resembles the real-life distribution (see Appendix), this experiment supports the hypothesized existence of multiple predictive models (signatures) in very large samples (>10,000).

Results of Experiments with Human Microarray Data-Multiple Signatures Produced by the TIE* Method have Maximal Predictive Accuracy in Independent Validation Datasets:

Tables 5A, 5B, and 5C show that the TIE* method achieves maximal classification accuracy in 5 out of 6 human validation datasets. Non-TIE* methods achieve maximal accuracy in 0 to 2 datasets depending on method. In the dataset where the TIE* method has accuracy that is statistically distinguishable from the empirical maximal (Lung Cancer Subtype Classification), the magnitude of this difference is <0.009 AUC on average over all discovered signatures. Thus this particular deviation from maximal accuracy may be considered negligible for practical purposes.

A detailed example of application of multiple signature discovery methods to the Leukemia 5 Yr. Prognosis task is provided in FIG. 12. The figure shows accuracy estimated in the discovery dataset (using an unbiased error estimator and protocol) against accuracy verified in the validation dataset for each signature. As can be seen, TIE* signatures have superior predictive accuracy and lower variance compared to the signatures output by other methods. Similar behavior can be observed in the other experiments as well.

Results of Experiments with Human Microarray Data-Multiple Signatures Produced by the TIE* Method are Statistically Reproducible Whereas Signatures from Other Methods are Often Overfitted:

FIG. 11 plots accuracy estimated in the discovery dataset (using an unbiased error estimator and protocol) against accuracy verified in the validation dataset for all methods averaged over all datasets and all discovered signatures. As noted above, validation datasets originate from different laboratories and/or using different microarray platforms than discovery datasets. The horizontal distance of each method to the diagonal measures the magnitude of overfitting defined as the difference ($\epsilon_1 - \epsilon_2$), where $\epsilon_1$=expected performance in the validation data obtained by cross-validation in the discovery dataset, and $\epsilon_2$=observed validation dataset performance. The TIE* method rests slightly right of the diagonal denoting no overfitting, or equivalently ideal statistical reproducibility on average. However all other methods exhibit varying degrees of non-reproducibility. Depending on method the average magnitude of overfitting varies from 0.02 to 0.03 AUC.

Results of Experiments with Real Data from Different Application Domains:

Tables 6A, 6B, and 6C show a list of real datasets used in experiments. The datasets were used in prior evaluation of Markov boundary methods (Aliferis et al., 2009a; Aliferis et al., 2009b) and were chosen on the basis of being representative of a wide range of problem domains (biology, medicine, economics, ecology, digit recognition, text categorization, and computational biology) in which Markov boundary induction and feature selection are essential. These datasets are challenging since they have a large number of features with small-to-large sample sizes. Several datasets used in prior feature selection and classification challenges were included. All datasets have a single binary response variable. The TIE* method was applied to these datasets, and its results are shown in Table 1. TIE* discovers multiple Markov boundaries in 10 out of 13 datasets with statistically comparable predictive accuracy.

Discoveries/Conclusions Enabled by the Invention:

The properties of the underlying data generative process affect computational feasibility of the predictive model discovery. In the worst case, it is computationally infeasible to discover even one of all optimal predictive models regardless of which one among all known sound methods is used. However, there exist several sound methods for discovering an optimal predictive model that run in low-order polynomial time in real high-dimensional data (e.g., HITON-PC in a variety of datasets). Even if the computational cost of discovery of one optimal predictive model (signature) was constant, the number of all optimal predictive models can grow exponentially large to the number of variables measured (for an example see Appendix). Thus the computational cost of dissecting predictive model (molecular signature) multiplicity ranges from low-order polynomial (tractable) to super-exponential (infeasible) depending on the distribution. The worst-case characteristics are a property of the distribution analyzed and not the method employed. The experiments presented here support that real-life data does not behave as the worst-case expected theoretical scenarios.

The results presented in this patent document refute or suggest that modifications are needed to several widespread positions about causes of signature and other predictive model multiplicity. The example model pathway in FIG. 1 demonstrates that predictive model (signature) reproducibility neither precludes multiplicity nor requires sample sizes with thousands of subjects. It also shows that multiplicity of predictive models (signatures) does not require dense connectivity of the underlying pathways. Similarly, it shows that noisy measurements or normalization are not necessary conditions for predictive model (signature) multiplicity. The re-simulation experimental data suggest that networks modeled after real gene expression data can exhibit predictive model (signature) multiplicity even in large sample sizes and that in this type of data, multiplicity is produced by a combination of small sample size-related variance and intrinsic multiplicity in the underlying network. The results with real human microarray datasets demonstrate the power of the disclosed inventive method, namely, that multiple predictive models (signatures) output by TIE* are reproducible and maximally accurate even though they are derived from small sample, noisy, and heavily-processed data.

With regard to non-TIE* prior art used in the experiments as baseline comparison methods, it is noted that resampling-based methods that use bootstrap samples to discover predictive models (signatures) may stop producing multiple models in large sample sizes. This is expected because resampling methods are designed to address directly only the small sample multiplicity and not the intrinsic multiplicity which persists in large samples. Iterative removal, on the other hand, by its design always fails to identify all maximally accurate and non-redundant predictive models (signatures) that have variables in common. A major limitation of KIAMB is that it has sample size requirements that range from at least linear to exponential to the number of variables in a predictive model (signature), depending on the test of independence employed. This makes the method not only computationally inefficient but also prone to statistical errors in small sample sizes. This leads to its substantial observed overfitting in the experiments with real data and its inability to find the maximally accurate and non-redundant predictive models (signatures) in simulated data. KIAMB, being a randomized search method, also guarantees to output all optimal predictive models that satisfy specific distributional requirements, but only after an infinite number of runs. The method, finally, by design will discover the same predictive models (signatures) over and over again further compounding its computational inefficiency.

The results presented in this patent document are consistent with the hypothesis that predictive model (signature) multiplicity in real-life datasets is created by a combination of several factors that include the following: First, the intrinsic information redundancy (due to input variable-variable and input variable-response relations) in the complex network of the underlying causal generating process. Second, the variability in the output of variable selection and classifier/regression methods especially in small sample sizes. Third, the small sample statistical indistinguishability of predictive models that have different large sample accuracy and/or redundancy characteristics (example is given in the Appendix). Fourth, the presence of hidden/unobserved variables (example is given in the Appendix). Fifth, distribution specific idiosyncrasies. One example being correlated measurement noise components that introduce a bias in certain types of datasets (e.g., gene expression profiles in which noise is localized in regions of certain microarray chips) (Balazsi and Oltvai, 2007). Another example being RNA amplification techniques that systematically distort measurements of transcript ratios (e.g., double-round T7-based amplification protocol) (Wagner and Radelof, 2007). Sixth, aggregation effects (e.g., cell mixtures and temporal aggregation) and any sampling from mixtures of distributions that affects inference of conditional independence relations that are needed to establish model equivalence according to the framework for multiplicity (Chu et al., 2003). Seventh, normalization and other data pre-processing methods that artificially increase correlations among variables (e.g., certain multivariate normalization methods in microarrays) (Gold et al., 2005; Ploner et al., 2005; Qiu et al., 2005). Finally eighth, the engineered redundancy in data measurements devices (e.g., multiple probes for the same gene in some microarray platforms). In datasets produced by dissimilar mechanisms, measured with different devices, pre-processed and modeled with a variety of methods, the relative contributions of the above factors to multiplicity will vary. As a result, methods that rely on a specific cause of multiplicity or combination of causes will not output all maximally accurate and non-redundant predictive models (signatures) in all types of data.

In contrast, the method disclosed in this patent document overcomes the problems of the prior art since it does not require a particular combination of factors causing predictive model (signature) multiplicity in order to be able to discover all maximally accurate and non-redundant predictive models (signatures). Because of efficient heuristics, TIE* can discover the optimal predictive model set very quickly when the connectivity is locally sparse, and the number of true optimal predictive models is low-order polynomial or smaller to the number of variables. A very important factor for the performance of TIE* is the choice of the base method to discover non-redundant and maximally accurate predictive models (signatures) in the distribution at hand. Latest developments in Markov boundary discovery provide such tools for high-dimensional data. One of the key advantages of these methods is their ability to implicitly control for false discovery rate (Aliferis et al., 2009a; Aliferis et al., 2009b).

The biological experiments used real data exclusively from human cancer gene expression microarray datasets for pragmatic reasons: known identity of observed variables, number and size of datasets, and maturity of standardization protocols that allows for multiple independent dataset validation experiments. The TIE* method taught in this patent document is directly applicable to any data and not limited to gene expression data as demonstrated in experiments with 13 real datasets from different application domains.

APPENDIX

Notation

In this specification capital letters in italics denote variables (e.g., A, B, C) and bold letters denote variable sets (e.g., X, Y, Z). The following standard notation of statistical independence relations was adopted: $T \perp A$ means that T is independent of variable set A. Similarly, if T is independent of variable set A given variable set B, this denoted as $T \perp A | B$. If the sign "$\not\perp$" is used instead of "$\perp$", this means dependence instead of independence.

Key Definitions

PREDICTIVE MODEL (OR MOLECULAR SIGNATURE OR SIGNATURE): A predictive model (or molecular signature or signature) is a model (e.g., classifier or regression model) that predicts a response variable of interest T (e.g., diagnosis or response to treatment in human patients) given values of input predictor variables (e.g., gene expression values).

MAXIMALLY ACCURATE PREDICTIVE MODEL (OR MOLECULAR SIGNATURE OR SIGNATURE): A maximally accurate predictive model (or molecular signature or signature) is a predictive model that maximizes predictive accuracy of the response variable T relative to all other predictive models that can be constructed from the given dataset.

MAXIMALLY ACCURATE AND NON-REDUNDANT PREDICTIVE MODEL (OR MOLECULAR SIGNATURE OR SIGNATURE): A maximally accurate and non-redundant predictive model (or molecular signature or signature) based on variables X is a maximally accurate predictive model such that any predictive model based on a proper subset of variables in X is not maximally accurate.

MARKOV BLANKET: A Markov blanket M of the response variable $T \in V$ in the joint probability distribution P over variables V is a set of variables conditioned on which all other variables are independent of T, i.e. for every $X \in (V \setminus M \setminus \{T\})$, $T \perp X | M$.

MARKET BOUNDARY: If M is a Markov blanket of T and no proper subset of M satisfies the definition of Markov blanket of T, then M is called a Markov boundary of T.

An Example of Predictive Model Multiplicity Due to Small Sample Size:

A simplified network structure and parameterization is shown in FIG. 14. It involves 4 variables (A, B, C, D) and a phenotypic response variable T. The assumption is made that this network has a faithful distribution and thus only one Markov boundary exists in large samples (Pearl, 2000; Pearl, 1988; Spirtes et al., 2000; Tsamardinos and Aliferis, 2003), which is {C, D}. Now consider that there is access to three small samples from this distribution such that: in sample 1 one cannot reliably establish that $T \perp A | \{C, D\}$, in sample 2 one cannot reliably establish that $T \perp B | \{C, D\}$, and in sample 3 one cannot reliably establish either $T \perp A | \{C, D\}$ or $T \perp B | \{C, D\}$. Three Markov boundaries can be estimated in the above samples, {C, D, A}, {C, D, B}, and {C, D, A, B}, respectively, assuming that neither A nor B significantly decrease the predictive accuracy of T in given samples.

An Example of Predictive Model Multiplicity Due to Hidden Variables:

A simplified network structure and parameterization is shown in FIG. 15. It involves 3 variables (H, $X_1$, $X_2$) and a phenotypic response variable T. In the distribution with all variables observed, there is only one Markov boundary of T, which is {H}. Now consider that variable H is not observed in the data (i.e., it is hidden). Because H is not observed and variables $X_1$ and $X_2$ contain exactly the same information, two Markov boundaries $\{X_1\}$ and $\{X_2\}$ can be estimated in this distribution. All these Markov boundaries have reproducible but suboptimal (relative to the original distribution with variable H observed) predictive accuracy of the phenotype.

The Number of Maximally Accurate and Non-Redundant Predictive Models is Worst-Case Exponential to the Number of Variables:

A simplified network structure and parameterization is shown in FIG. 16. It involves n variables ($X_1, X_2, \ldots, X_n$) and a phenotypic response variable T. Variables can be divided into m groups such that any two variables in a group contain exactly the same information. Since there are n/m variables in each group, the total number of Markov boundaries is $(n/m)^m$. Now assume that $m = k \cdot n$, where $k < 1$. Then the total number of Markov boundaries is $(1/k)^{k \cdot n}$. Since $1/k > 1$ and $k \cdot n = O(n)$, it follows that the number of Markov boundaries grows exponentially with the number of variables in this example.

Details about Implementation of the TIE* Method on a General Purpose Digital Computer:

In experiments with real and/or resimulated gene expression data, the implementation of the TIE* method set forth in FIG. 3 was used with the following details:

The parameters α and max-k of the Markov boundary method HITON-PC were optimized by cross-validation[5] to achieve maximum predictive accuracy;

To estimate accuracy of predictive models (signatures), a cross-validation method was used whereby ⅔ of the data was used to identify variables (genes) in the predictive models (signatures) and fit the classifier and ⅓ of the data was used to estimate classification performance using the AUC metric (Fawcett, 2003);

To compare accuracy of predictive models (signatures), the nonparametric method of Delong et al. (DeLong et al., 1988) was used.

In experiments with (i) simulated data where both generative model and all Markov boundaries are known and (ii) in 13 real datasets from different domains, a similar implementation of the TIE* method was used with the following two differences. First, instead of Fisher's Z-test in HITON-PC, $G^2$ test was used that is suitable for distribution in hand. Second, a criterion INDEPENDENCE (FIG. 8) to verify Markov boundaries was used in step 6 of the TIE* method (FIG. 2).

Previous Methods for Multiple Predictive Model (Signature) Identification Used in Experiments:

Eight previously known methods were used to discover multiple predictive models (signatures) and the results compared to the results obtained with the TIE* method. The eight methods were executed for up to one week of single-CPU time or to produce up to 5,000 predictive models (signatures) per method and discovery dataset, whatever termination criterion was met first.

Four methods are resampling-based techniques that apply a predictive model (signature discovery) method to bootstrap samples of the original dataset. The following predictive model (signature) discovery methods were used: (i) SVM-based recursive feature elimination (SVM-RFE) (Guyon et al., 2002); (ii) SVM-RFE with additional application of a formal statistical comparison test[6] to identify the most parsimonious predictive model (signature) with accuracy statistically indistinguishable from the observed best one; (iii) backward wrapping based on univariate ranking of variables by Kruskal-Wallis non-parametric ANOVA (Hollander and Wolfe, 1999; Statnikov et al., 2005); and (iv) backward wrapping based on Kruskal-Wallis ANOVA with additional statistical comparison step, as in (ii). The above four methods are denoted as Resampling-SVM-RFE1, Resampling-SVM-RFE2, Resampling-Univariate1, Resampling-Univariate2, respectively.

Three other methods are representatives of stochastic variable selection methods. Three instantiations of KIAMB method (Peña et al., 2007) were used. KIAMB is applied with Fisher's Z-test for continuous data (gene expression data) and $G^2$ test for discrete data (artificial simulated data), parameter K=0.8, and three statistical thresholds α=0.01, α=0.005, and α=0.001 (denoted as KIAMB1, KIAMB2, KIAMB3, respectively). The first threshold was used by the inventors of the method in the paper that introduced it (Peña et al., 2007), while the latter two often lead to more parsimonious predictive models (signatures) without loss of predictive accuracy. A standard statistical threshold α=0.05 in most cases does not lead to termination of the method, that is why it was not used in this work. To make the experiments computationally tractable and robust to outlier runs of KIAMB, a 10 minute time limit was imposed for a single run of the method.

Finally, an Iterative Removal method (Natsoulis et al., 2005) was applied. The implementation of this method uses a predictive model (signature) discovery method HITON-PC (Aliferis et al., 2009a; Aliferis et al., 2003) since it typically yields more compact predictive models (signatures) with predictive accuracy comparable or better to the other variable selection methods (Aliferis et al., 2006). Statistical comparison tests were also used to compare predictive accuracy of the predictive models (signatures) (DeLong et al., 1988; Everitt, 1977).

Predictive (Classification) Methods:

To build classification models (signatures) of the response variable from identified predictor variable sets, a support vector machine (SVM) method (Vapnik, 1998) was used that is known to be a "best of class" method for classification of gene expression microarray data (Furey et al., 2000; Statnikov et al., 2008; Statnikov et al., 2005). The underlying idea of SVM classifiers is to calculate a maximal margin hyperplane separating two categories of subjects, i.e. cases and controls. Subjects are classified according to the side of the hyperplane they belong to. SVM implementation in the libSVM software library (Fan et al., 2005) was used. For experiments with artificial data where the response variable is multicategory, a one-versus-rest SVM classifiers (Schölkopf et al., 1999) was used.

Metrics for Assessing Predictive Accuracy:

For experiments with real and resimulated gene expression data as well as real data from different domains where the phenotypic response variable has two categories, area under the ROC curve (AUC) metric (Fawcett, 2003) was used. For experiments with artificial simulated data where the response variable is multicategory, weighted accuracy (Guyon et al., 2006) was used.

Generation of Artificial Simulated Data:

Using the example of FIG. 1, a discrete artificial simulated network with 30 variables was constructed (29 variables and a phenotypic response variable T) such that all Markov boundaries are known. FIG. 17 shows the network structure and specifies which variables contain the same information about T by the same filling pattern. For example, variables $X_{12}$, $X_{13}$, and $X_{14}$ provide exactly the same information about T and thus are interchangeable for prediction of T. The network contains 72 Markov boundaries of T. Each of these Markov boundaries contains 5 variables: (i) $X_{10}$, (ii) $X_5$ or $X_9$, (iii) $X_{12}$ or $X_{13}$ or $X_{14}$, (iv) $X_{19}$ or $X_{20}$ or $X_{21}$, and (v) $X_1$ or $X_2$ or $X_3$ or $X_{11}$.

Similarly a network with 1,000 variables was constructed (999 variables and a phenotypic response variable T) by augmenting network in FIG. 17 with a total of 970 variables such that the resulting network has exactly the same 72 Markov boundaries. Out of 970 variables that were added to the prior network, 110 variables have a connecting path to T and 860 variables do not.

Using logic sampling method (Russell and Norvig, 2003), 3,750 observations were generated from both networks. 750 observations were used for discovery of multiple predictive models (signatures) and the remaining 3,000 for validation of predictive accuracy of T.

Generation of Resimulated Microarray Gene Expression Data:

The ability to produce realistic simulated data is a critical component of evaluating multiple signature identification methods in a systematic manner. In order to obtain large, realistic networks and data capturing the characteristics of human gene expression data, a High-Fidelity Data Resimulation technique was applied that generates synthetic data from a causal process that is induced from the real data and guarantees that the synthetic data is indistinguishable from the real data. Below is briefly outlined the method and its application, more details can be found in (Aliferis and Statnikov, 2007).

The High-Fidelity Data Resimulation technique involves 6 steps[7]. First, a gene network is reverse-engineered from a real gene expression dataset. This step is performed by (a) obtaining an undirected graph by running HITON-PC method for each gene and phenotype, (b) orienting the graph using greedy search-and-score learning with Bach's metric (Bach and Jordan, 2003), and (c) learning densities of each gene and phenotype using SVM regression (Schölkopf et al., 1999) and classification (Vapnik, 1998), respectively. Second, synthetic data is generated from the above network using logic sampling (Russell and Norvig, 2003). Third, a power-law relationship between genes and their connectivity is examined in the simulated network (Barabasi and Bonabeau, 2003; Jeong et al., 2000). Fourth, a powerful classifier is applied to distinguish real from simulated data. The harder it is to perform this classification task, the better is the quality of resimulation. Fifth, Fisher's Z-test is used to ensure that statistical dependencies and independencies true in the real data are preserved in simulated data and vice-versa. Sixth, the existence of multiple maximally accurate and non-reducible signatures in simulated data is empirically demonstrated.

The above process was applied to 1,000 randomly selected variables (999 oligonucleotide gene probes and a phenotype variable) from the 12,600 gene probes in the Affymetrix U95A array lung cancer gene expression data of (Bhattacharjee et al., 2001). The phenotype variable denotes whether a subject has lung cancer or not. Once the network was reverse-engineered (step 1), a set of 30,000 samples was generated from this network (step 2). The synthetic network and data passed validation steps 3-6. More details are given in (Aliferis and Statnikov, 2007).

Criteria for Microarray Gene Expression Dataset Admissibility and Protocol for Quality Assurance and Processing:

As noted earlier, discovery and validation datasets either originate from different laboratories or from different microarray platforms. The following criteria was imposed for dataset admissibility: same phenotype and same or very similar patient population in both datasets, both datasets produced by microarray platforms from Affymetrix, sample size in discovery dataset≥100, and sample size in discovery dataset≥sample size in validation dataset. Once candidate pairs of discovery and validation datasets that satisfy the above criteria were obtained, the following quality assurance and processing procedure was used: (i) remove all patients/samples that are common between discovery and validation datasets (if applicable); (ii) for clinical outcome prediction tasks, remove censored patients/samples; (iii) if different microarray platforms are used, include only matching probes (obtained by using Affymetrix Array Comparison Spreadsheets found on the World Wide Web at: http://www.affymetrix.com/support/technical/comparison_spreadsheets.affx); (iv) ensure same or comparable normalization of both datasets; (v) verify presence of at least moderate predictive signal of the phenotype (>0.6 area under ROC curve) by using signature based on all genes, and finally (vi) ensure same or statistically indistinguishable performance of the signature based on all genes when trained and tested by cross-validation in the discovery dataset and when trained in the discovery dataset and tested in the validation dataset. The last step is used to ensure that the populations of patients/samples are comparable between two datasets. To perform statistical testing in this step, 95% confidence intervals were built around each of the two point estimates[8] of area under ROC curve (DeLong et al., 1988) and verify that at least one of these confidence intervals includes a point estimate from another dataset.

FOOTNOTES

1. In many papers in the scientific and technical literature methods are discussed as aiming to find Markov blankets, however they mean Markov boundaries or non-redundant Markov blankets. Confusion is avoided because it is clear from the context what the purpose of each method is.
2. For a given set of genes X, the minimal error decision function minimizes the error of predicting the phenotypic variable T given X over all possible decision functions.
3. "Local pathway" is defined as genes directly upstream or downstream of the response variable T.
4. A signature is called "non-reducible" if it is not properly included in any other signature output by this method (i.e., it is a proxy of having no redundant genes). For example, if a method outputs 3 signatures with the following genes: {A, B, C}, {A, B, X}, and {A, B}, only signature {A, B} is non-reducible.
5. The parameters were optimized over the following values: ($\alpha$=0.05, max-k=1), ($\alpha$=0.05, max-k=2), ($\alpha$=0.05, max-k=3), ($\alpha$=0.01, max-k=1), and ($\alpha$=0.01, max-k=2).
6. Delong's test (DeLong et al., 1988) was used to compare AUC point estimates in experiments with real gene expression data where the response variable has two categories. McNemar's test (Everitt, 1977) was used to compare accuracies in experiments with simulated data where the response variable has more than two categories and AUC measure is not applicable.
7. Steps 3-6 are used only for quality assurance purposes.
8. One point estimate is obtained when a classifier is trained and tested by cross-validation in the discovery dataset, and another one is obtained when a classifier is trained in the discovery dataset and tested in the validation dataset.

REFERENCES

Aliferis, C. F. et al. (2009a) Local Causal and Markov Blanket Induction for Causal Discovery and Feature Selection for Classification. Part I: Algorithms and Empirical Evaluation. Journal of Machine Learning Research.

Aliferis, C. F. and Statnikov, A. (2007) High-Fidelity Resimulation from High-Throughput Data. Technical Report DSL 07-03.

Aliferis, C. F. et al. (2006) Local regulatory-network inducing algorithms for biomarker discovery from mass-throughput datasets. Technical Report DSL 06-05.

Aliferis, C. F. et al. (2009b) Local Causal and Markov Blanket Induction for Causal Discovery and Feature Selection for Classification. Part II: Analysis and Extensions. Journal of Machine Learning Research.

Aliferis, C. F., Tsamardinos, I. and Statnikov, A. (2003) HITON: a novel Markov blanket algorithm for optimal variable selection. AMIA 2003 Annual Symposium Proceedings, 21-25.

Aphinyanaphongs, Y., Statnikov, A. and Aliferis, C. F. (2006) A comparison of citation metrics to machine learning filters for the identification of high quality MEDLINE documents. J. Am. Med. Inform. Assoc., 13, 446-455.

Azuaje, F. and Dopazo, J. (2005) Data analysis and visualization in genomics and proteomics. John Wiley, Hoboken, N.J.

Bach, F. R. and Jordan, M. I. (2003) Learning graphical models with Mercer kernels. Advances in Neural Information Processing Systems (NIPS), 15, 1009-1016.

Balazsi, G. and Oltvai, Z. N. (2007) A pitfall in series of microarrays: the position of probes affects the cross-correlation of gene expression profiles. Methods Mol. Biol, 377, 153-162.

Barabasi, A. L. and Bonabeau, E. (2003) Scale-free networks. Sci. Am., 288, 60-69.

Beer, D. G. et al. (2002) Gene-expression profiles predict survival of patients with lung adenocarcinoma. Nat. Med., 8, 816-824.

Bhattacharjee, A. et al. (2001) Classification of human lung carcinomas by mRNA expression profiling reveals distinct adenocarcinoma subclasses. Proc. Natl. Acad. Sci. U.S.A, 98, 13790-13795.

Chu, T. et al. (2003) A statistical problem for inference to regulatory structure from associations of gene expression measurements with microarrays. Bioinformatics, 19, 1147-1152.

Conrads, T. P. et al. (2004) High-resolution serum proteomic features for ovarian cancer detection. Endocr. Relat Cancer, 11, 163-178.

DeLong, E. R., DeLong, D. M. and Clarke-Pearson, D. L. (1988) Comparing the areas under two or more correlated receiver operating characteristic curves: a nonparametric approach. Biometrics, 44, 837-845.

Dougherty, E. and Brun, M. (2006) On the number of close-to-optimal feature sets. Cancer Informatics, 2, 189-196.

Ein-Dor, L. et al. (2005) Outcome signature genes in breast cancer: is there a unique set? Bioinformatics, 21, 171-178.

Ein-Dor, L., Zuk, O. and Domany, E. (2006) Thousands of samples are needed to generate a robust gene list for predicting outcome in cancer. Proc. Natl. Acad. Sci. U.S.A, 103, 5923-5928.

Everitt, B. (1977) The analysis of contingency tables. Chapman and Hall, London.

Fan, R. E., Chen, P. H. and Lin, C. J. (2005) Working set selection using second order information for training support vector machines. Journal of Machine Learning Research, 6, 1918.

Fawcett, T. (2003) ROC Graphs: Notes and Practical Considerations for Researchers. Technical Report, HPL-2003-4, HP Laboratories.

Foster, D. P. and Stine, R. A. (2004) Variable Selection in Data Mining: Building a Predictive Model for Bankruptcy. Journal of the American Statistical Association, 99, 303-314.

Freije, W. A. et al. (2004) Gene expression profiling of gliomas strongly predicts survival. Cancer Res., 64, 6503-6510.

Furey, T. S. et al. (2000) Support vector machine classification and validation of cancer tissue samples using microarray expression data. Bioinformatics, 16, 906-914.

Gold, D. L., Wang, J. and Coombes, K. R. (2005) Inter-gene correlation on oligonucleotide arrays: how much does normalization matter? Am. J. Pharmacogenomics., 5, 271-279.

Golub, T. R. et al. (1999) Molecular classification of cancer: class discovery and class prediction by gene expression monitoring. Science, 286, 531-537.

Grate, L. R. (2005) Many accurate small-discriminatory feature subsets exist in microarray transcript data: biomarker discovery. BMC Bioinformatics, 6, 97.

Guyon, I., Aliferis, C. F. and Elisseeff, A. (2007) Causal Feature Selection. In Liu, H. and Motoda, H. (eds), Computational Methods of Feature Selection. Chapman and Hall.

Guyon, I. et al. (2006) Feature extraction: foundations and applications. Springer-Verlag, Berlin.

Guyon, I. and Elisseeff, A. (2003) An introduction to variable and feature selection. Journal of Machine Learning Research, 3, 1157-1182.

Guyon, I. et al. (2002) Gene selection for cancer classification using support vector machines. Machine Learning, 46, 389-422.

Hammer, B. and Gersmann, K. (2003) A Note on the Universal Approximation Capability of Support Vector Machines. Neural Processing Letters, 17, 43-53.

Hollander, M. and Wolfe, D. (1999) Nonparametric statistical methods. Wiley, New York, N.Y., USA.

Ioannidis, J. P. (2005) Microarrays and molecular research: noise discovery? Lancet, 365, 454-455.

Jeong, H. et al. (2000) The large-scale organization of metabolic networks. Nature, 407, 651-654.

Joachims, T. (2002) Learning to classify text using support vector machines. Kluwer Academic Publishers, Boston.

Kohavi, R. and John, G. H. (1997) Wrappers for feature subset selection. Artificial Intelligence, 97, 273-324.

Li, L. et al. (2001) Gene selection for sample classification based on gene expression data: study of sensitivity to choice of parameters of the GA/KNN method. Bioinformatics, 17, 1131-1142.

Mani, S. and Cooper, G. F. (1999) A Study in Causal Discovery from Population-Based Infant Birth and Death Records. Proceedings of the AMIA Annual Fall Symposium, 319.

Michiels, S., Koscielny, S. and Hill, C. (2005) Prediction of cancer outcome with microarrays: a multiple random validation strategy. Lancet, 365, 488-492.

Natsoulis, G. et al. (2005) Classification of a large microarray data set: algorithm comparison and analysis of drug signatures. Genome Res., 15, 724-736.

Pearl, J. (1988) Probabilistic reasoning in intelligent systems: networks of plausible inference. Morgan Kaufmann Publishers, San Mateo, Calif.

Pearl, J. (2000) Causality: models, reasoning, and inference. Cambridge University Press, Cambridge, U.K.

Peña, J. et al. (2007) Towards scalable and data efficient learning of Markov boundaries. International Journal of Approximate Reasoning, 45, 211-232.

Phillips, H. S. et al. (2006) Molecular subclasses of high-grade glioma predict prognosis, delineate a pattern of disease progression, and resemble stages in neurogenesis. Cancer Cell, 9, 157-173.

Ploner, A. et al. (2005) Correlation test to assess low-level processing of high-density oligonucleotide microarray data. BMC Bioinformatics, 6, 80.

Qiu, X. et al. (2005) The effects of normalization on the correlation structure of microarray data. BMC Bioinformatics, 6, 120.

Ramaswamy, S. et al. (2003) A molecular signature of metastasis in primary solid tumors. Nat Genet, 33, 49-54.

Roepman, P. et al. (2006) Multiple robust signatures for detecting lymph node metastasis in head and neck cancer. Cancer Res., 66, 2361-2366.

Rosenwald, A. et al. (2002) The use of molecular profiling to predict survival after chemotherapy for diffuse large-B-cell lymphoma. N. Engl. J. Med., 346, 1937-1947.

Ross, M. E. et al. (2003) Classification of pediatric acute lymphoblastic leukemia by gene expression profiling. Blood, 102, 2951-2959.

Russell, S. J. and Norvig, P. (2003) Artificial intelligence: a modern approach. Prentice Hall/Pearson Education, Upper Saddle River, N.J.

Schölkopf, B., Burges, C. J. C. and Smola, A. J. (1999) Advances in kernel methods: support vector learning. MIT Press, Cambridge, Mass.

Shawe-Taylor, J. and Cristianini, N. (2004) Kernel methods for pattern analysis. Cambridge University Press, Cambridge, UK.

Somorjai, R. L., Dolenko, B. and Baumgartner, R. (2003) Class prediction and discovery using gene microarray and proteomics mass spectroscopy data: curses, caveats, cautions. Bioinformatics, 19, 1484-1491.

Sotiriou, C. et al. (2006) Gene expression profiling in breast cancer: understanding the molecular basis of histologic grade to improve prognosis. J. Natl. Cancer Inst., 98, 262-272.

Spirtes, P., Glymour, C. N. and Scheines, R. (2000) Causation, prediction, and search. MIT Press, Cambridge, Mass.

Statnikov, A., Wang, L. and Aliferis, C. F. (2008) A comprehensive comparison of random forests and support vector machines for microarray-based cancer classification. BMC Bioinformatics, 9, 319.

Statnikov, A. (2008) Algorithms for Discovery of Multiple Markov Boundaries: Application to the Molecular Signature Multiplicity Problem. Ph. D. Thesis, Department of Biomedical Informatics, Vanderbilt University.

Statnikov, A. et al. (2005) A comprehensive evaluation of multicategory classification methods for microarray gene expression cancer diagnosis. Bioinformatics, 21, 631-643.

Su, A. I. et al. (2001) Molecular classification of human carcinomas by use of gene expression signatures. Cancer Res., 61, 7388-7393.

Tsamardinos, I. and Aliferis, C. F. (2003) Towards principled feature selection: relevancy, filters and wrappers. Proceedings of the Ninth International Workshop on Artificial Intelligence and Statistics (AI & Stats).

Tsamardinos, I., Aliferis, C. F. and Statnikov, A. (2003) Time and sample efficient discovery of Markov blankets and direct causal relations. Proceedings of the Ninth International Conference on Knowledge Discovery and Data Mining (KDD), 673-678.

Vapnik, V. N. (1998) Statistical learning theory. Wiley, New York.

Wagner, F. and Radelof, U. (2007) Performance of different small sample RNA amplification techniques for hybridization on Affymetrix GeneChips. J Biotechnol, 129, 628-634.

Wang, Y. et al. (2005) Gene-expression profiles to predict distant metastasis of lymph-node-negative primary breast cancer. Lancet, 365, 671-679.

Yeoh, E. J. et al. (2002) Classification, subtype discovery, and prediction of outcome in pediatric acute lymphoblastic leukemia by gene expression profiling. Cancer Cell, 1, 133-143.

We claim:

1. A computer implemented method of determining multiple Markov boundaries of the response variable from an input dataset, said method comprising the following steps:
  (a) determining a single Markov boundary M of the response variable using a Markov boundary discovery method X;
  (b) applying a strategy Y to generate a subset of variables and temporarily withhold this subset from the original dataset;
  (c) running a Markov boundary discovery method X on the dataset originating from step (b) to determine a candidate Markov boundary $M_{new}$;
  (d) using a criterion Z to verify that the candidate Markov boundary $M_{new}$ is indeed a Markov boundary in the original distribution in which no variables are withheld;
  (e) repeating steps (b)-(d) until no new Markov boundaries can be discovered in the original distribution; and
  (f) outputting M from step (a) and all $M_{new}$ that passed the verification criterion Z in step (d)
wherein all steps are performed on a suitably programmed computer.

2. The method of claim 1, in which a predictive model is constructed for every Markov boundary discovered by the method.

3. The method of claim 2, used to construct multiple molecular signatures of the phenotype/response variable in high-throughput assay data.

4. The method of claim 1, used to discover molecules that participate in multiple molecular signatures of the phenotype/response variable in high-throughput assay data.

5. The method of claim 1, in which different Markov boundary discovery methods are used in steps (a) and (c).

6. The method of claim 1, in which a feature selection instead of Markov boundary discovery method is used in steps (a) and (c).

7. The method of claim 1, in which the strategy Y temporarily withholds subsets of the union of the so-far discovered Markov boundaries.

8. The method of claim 1, in which the criterion Z uses statistical conditional independence test to verify that the candidate Markov boundary $M_{new}$ is indeed a Markov boundary in the original distribution.

9. The method of claim 1, in which the criterion Z uses a predictive method and predictive error estimation method and a method to compare predictive error estimates to verify that $M_{new}$ is a Markov boundary of the response variable in the original distribution.

10. The method of claim 1, in which the criterion Z uses a combination of a statistical conditional independence test and a predictive method to verify that $M_{new}$ is a Markov boundary of the response variable in the original distribution.

11. The method of claim 1, in which it is applied on resampled samples of the original distribution.

12. The method of claim 1, further comprising: prior to said step (a), preprocessing the data set.

13. The method of claim 1, further comprising using the Markov boundary to identify: direct causes, direct effects and spouses of the response variable.

14. The method of claim 1, wherein it is terminated when other Markov boundaries can still be discovered.

15. The method of claim 1, in which a feature selection instead of Markov boundary discovery method is used in step (c).

16. The method of claim 1, in which a feature selection instead of Markov boundary discovery method is used in step (a).

17. A system for determining multiple Markov boundaries of the response variable from an input dataset, comprising:
  (a) a suitably programmed digital computer;
  (b) means for determining a single Markov boundary M of the response variable using a Markov boundary discovery method X;
  (c) means for applying a strategy Y to generate a subset of variables and temporarily withholding this subset from the original dataset;
  (d) means for running a Markov boundary discovery method X on the dataset originating from means (c) to determine a candidate Markov boundary $M_{new}$;
  (e) means for using a criterion Z to verify that the candidate Markov boundary $M_{new}$ is indeed a Markov boundary in the original distribution in which no variables are withheld;
  (f) means for repeating means (c)-(e) until no new Markov boundaries can be discovered in the original distribution; and
  (g) outputting M from step (b) and all $M_{new}$ that passed the verification criterion Z in step (e)
wherein all steps are performed on the computer.

* * * * *